United States Patent [19]

Simpson

[11] Patent Number: 5,267,191
[45] Date of Patent: Nov. 30, 1993

[54] FIFO MEMORY SYSTEM
[75] Inventor: David L. Simpson, West Columbia, S.C.
[73] Assignee: NCR Corporation, Dayton, Ohio
[21] Appl. No.: 331,917
[22] Filed: Apr. 3, 1989
[51] Int. Cl.$^5$ .................. G11C 7/00; G11C 19/00; G11C 21/00
[52] U.S. Cl. .................. 365/78; 365/221; 365/189.04
[58] Field of Search .................. 365/78, 76, 221, 222, 365/189.01, 189.04

[56] References Cited

U.S. PATENT DOCUMENTS

| | | |
|---|---|---|
| 4,062,059 | 12/1977 | Suzuki et al. |
| 4,369,336 | 1/1983 | Agnello . |
| 4,459,681 | 7/1984 | Ohtsuka . |
| 4,507,776 | 3/1985 | Fraser . |
| 4,535,427 | 8/1985 | Jiang . |
| 4,694,426 | 9/1987 | Mason . |
| 4,751,671 | 6/1988 | Babetski et al. . |
| 4,829,475 | 5/1989 | Ward et al. .......... 365/78 |
| 4,864,543 | 9/1989 | Ward et al. .......... 365/221 |
| 4,888,739 | 12/1989 | Frederick et al. .......... 365/221 |
| 4,891,788 | 1/1990 | Kreifels .......... 365/221 X |

Primary Examiner—Alyssa H. Bowler
Attorney, Agent, or Firm—Douglas S. Foote

[57] ABSTRACT

The subject invention is a FIFO memory system and method for buffering data between two data busses. The system comprises a RAM memory, write and read pointer registers, an offset generator, a programmable offset register, and a comparator. The write pointer register stores the address of the next data element to be written into the RAM memory, and the read pointer register stores the address of the next data element to be read from the RAM memory. The offset generator compares the contents of the registers, and generates at an output thereof an offset signal representing the amount of memory space occupied. The programmable offset register provides a programmed offset signal. The comparator compares the offset signal and the programmed offset signal, and provides a ready signal when the offset signal is greater than or equal to the programmed offset signal.

34 Claims, 21 Drawing Sheets

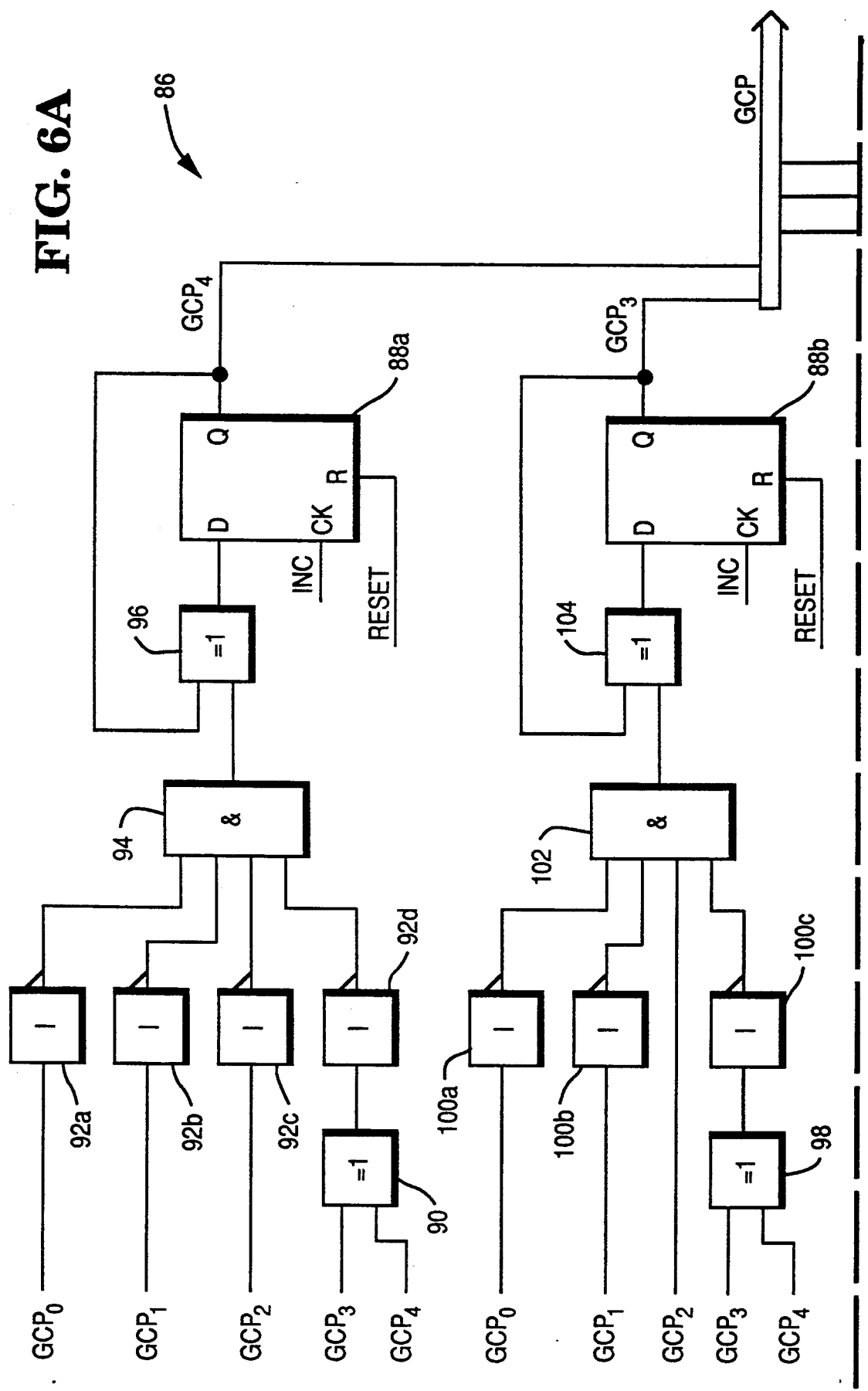

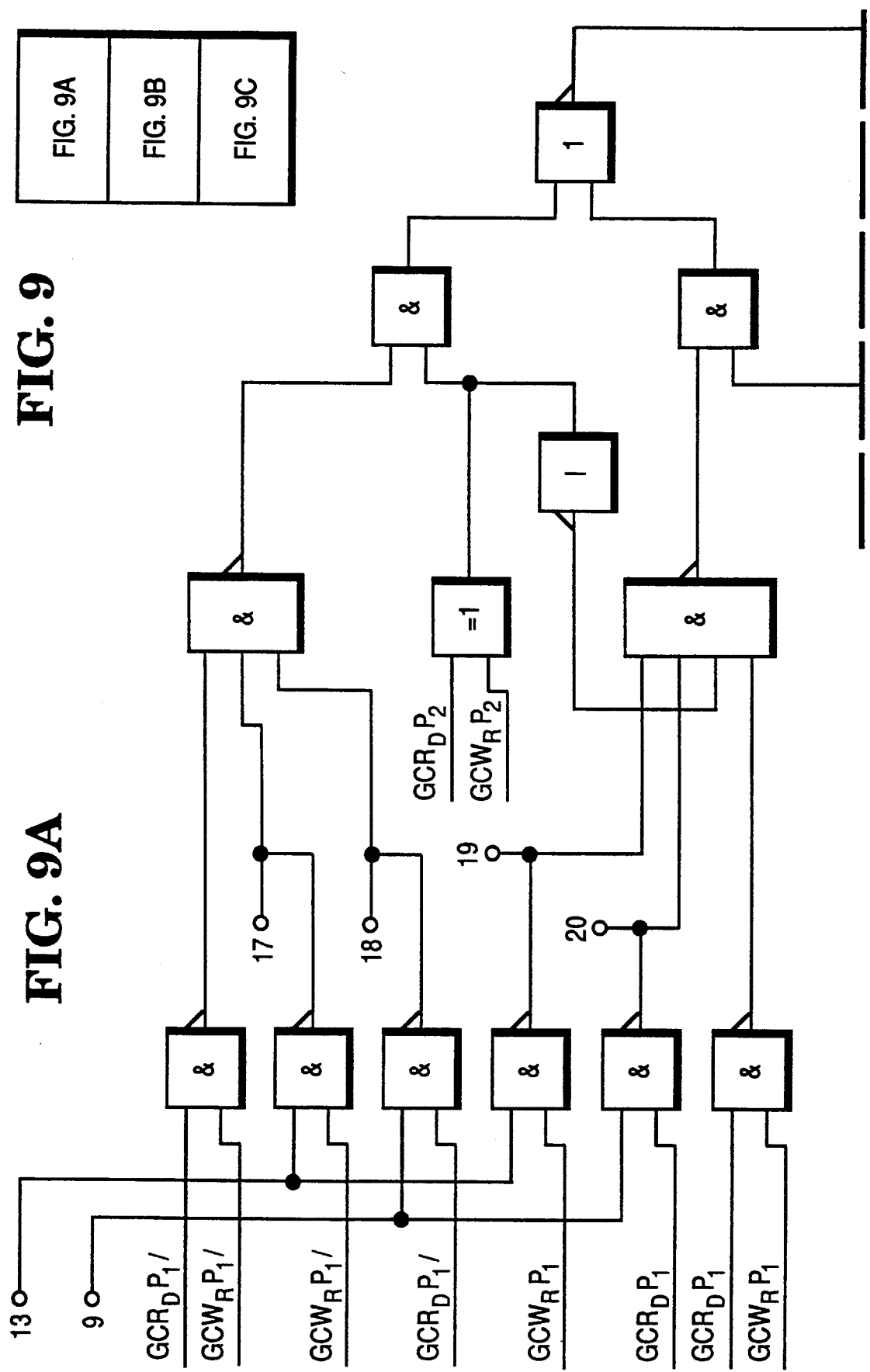

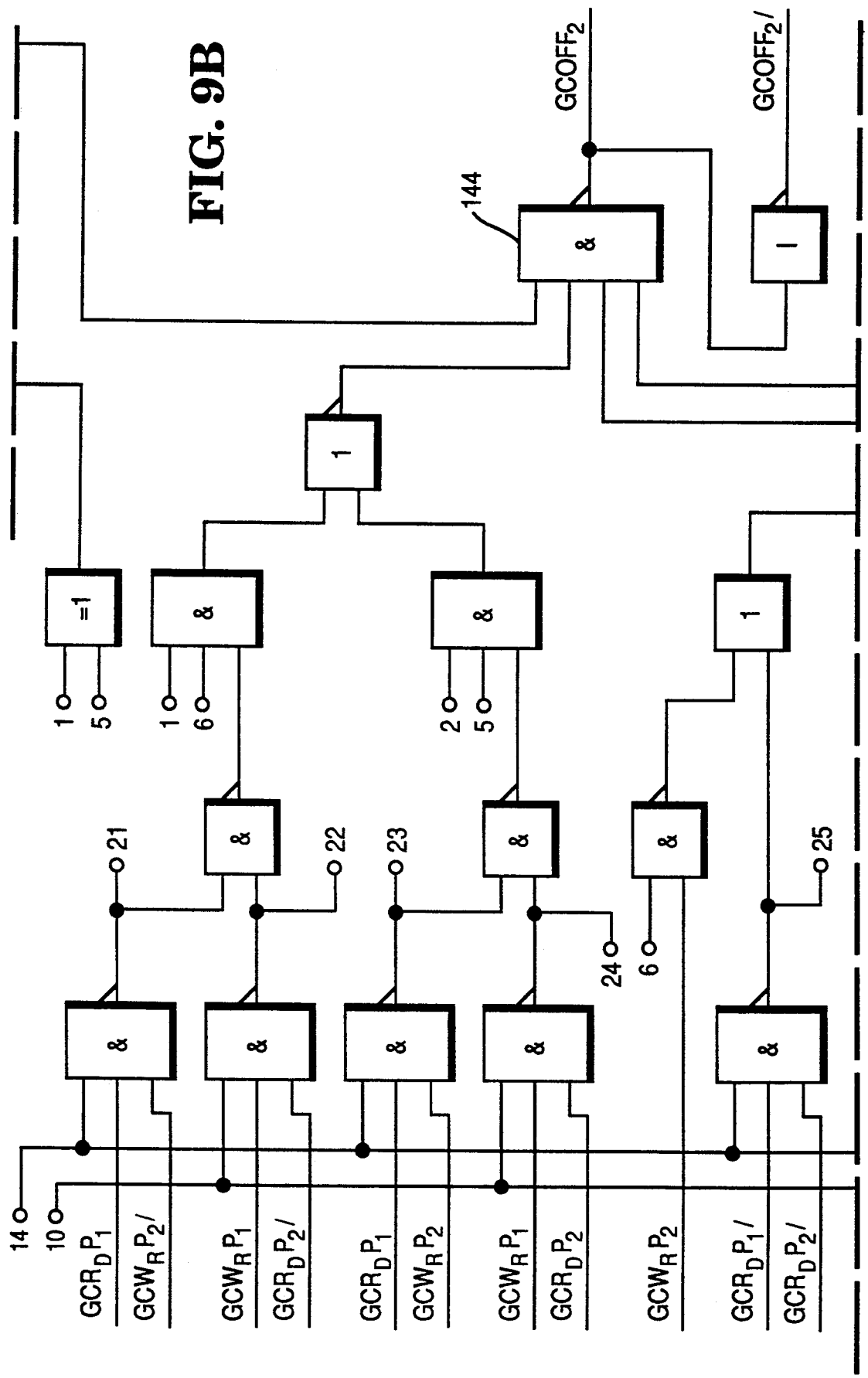

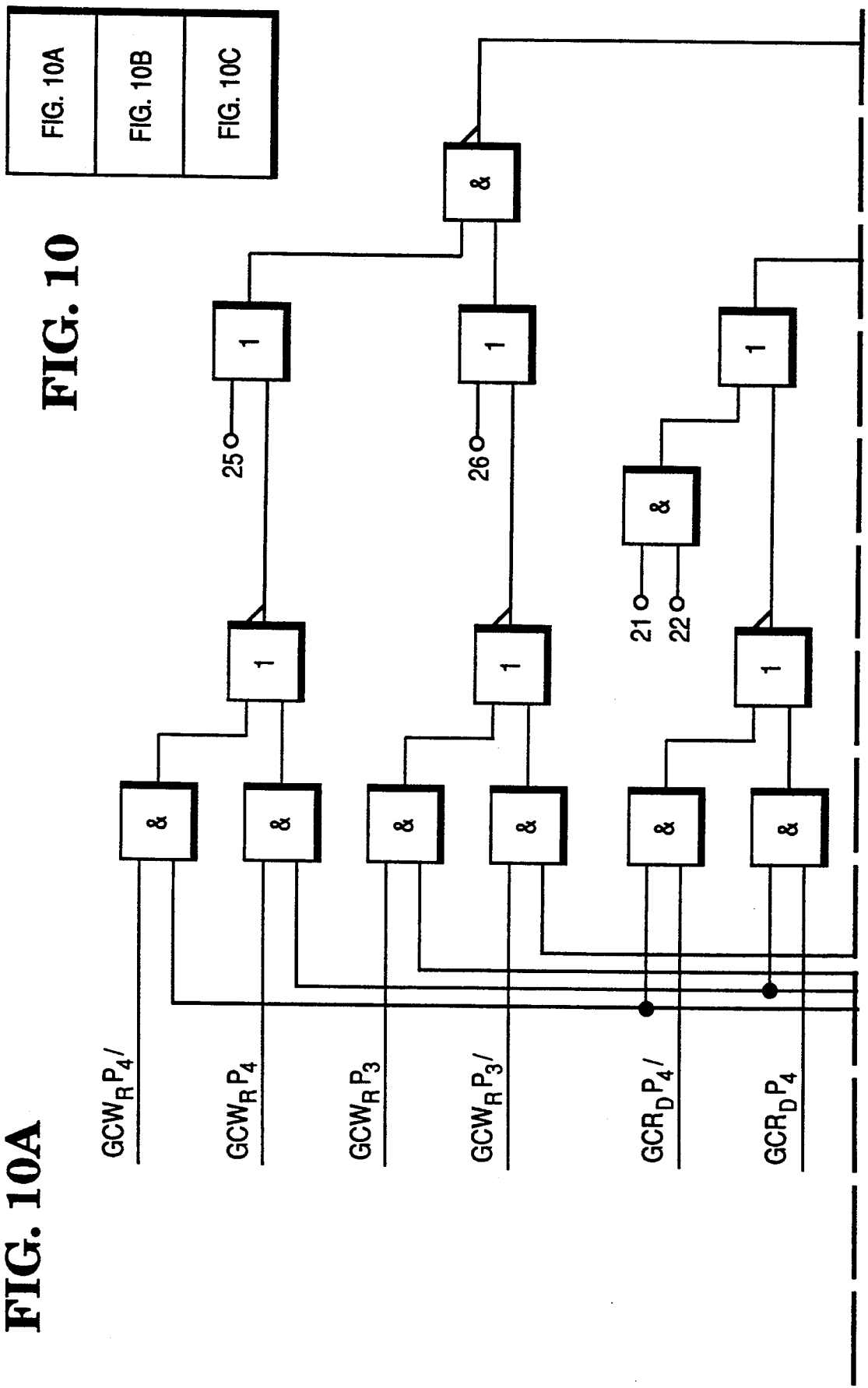

FIFO MEMORY SYSTEM

The present invention relates to data processing systems, and, more particularly to data buffering circuits employing FIFO memories.

BACKGROUND OF THE INVENTION

In data processing systems it is frequently necessary to buffer or temporarily hold data being transferred within or outside of the system. The need to buffer data may arise because the receiver is busy when the data is transferred, or because the transfer rates of the transmitter and receiver are different. Whatever the reason, the data must be recovered from the buffer in the order it is transmitted. This process is known as first-in, first-out (FIFO).

FIFO memory devices typically have means to keep track of the status of the FIFO, namely, whether it is empty or full, and to generate signals when the FIFO is at the empty or full state. Such means may include write and read pointers and a comparator. The write pointer keeps track of the next location in the memory to be written to, and is incremented each time a data element is entered. The read pointer keeps track of the location in the memory where the last data element was read from and is incremented as data elements are read. The comparator basically determines when the pointers are equal or differ by a predetermined (constant) amount.

In addition to empty and full signals, some comparators also generate another signal indicating a predetermined amount of data has been stored in the buffer. For example, this other signal may be generated when the buffer is half full. This other signal is useful to maintain an efficient flow of data through the buffer. The aforementioned signal indicates when the buffer is filled to a predetermined level and may be used to indicate when the buffer should be read. This level may be optimized for a given system, but may be less than ideal for another system or for different operating conditions of the given system.

Another problem experienced by the means which track the amount of data in the FIFO is that the output signals—empty, full, etc.—are known to glitch or momentarily depart from their correct level due to nonuniform delays through binary counters and adders. To avoid such glitches the output signals are typically synchronized or only sampled after the outputs have stabilized. This requires the FIFO to be synchronized with the system clock.

OBJECTS OF THE INVENTION

It is therefore an object of the present invention to provide a new and improved FIFO memory system.

It is another object of the present invention to provide a FIFO memory system with a means for programming the level at which a FIFO ready signal is generated.

It is yet another object of the present invention to provide a FIFO memory system with glitch free output signals.

It is a further object of the present invention to provide a FIFO memory system with asynchronous read and write operations for more efficient data transfer.

Summary of the Invention

One form of the present invention is a FIFO memory system comprising a RAM memory, write and read pointer registers, an offset generator, a programmable offset register, and a comparator. The write pointer register stores the address of the next data element to be written into the RAM memory, and the read pointer register stores the address of the next data element to be read from the RAM memory. The offset generator compares the contents of the registers, and generates at an output thereof an offset signal representing the amount of memory space occupied. The programmable offset register provides a programmed offset signal. The comparator compares the offset signal and the programmed offset signal, and provides a ready signal when the offset signal is greater than or equal to the programmed offset signal.

In one embodiment of the FIFO memory system, the write and read pointer registers store minimum change coded addresses.

Another form of the present invention is a method for buffering data between two data busses. A programmable offset register is loaded with a programmed offset value. A data element is written into a RAM memory. A write pointer is incremented to identify the address of the next data element to be written into the RAM memory. A read pointer is provided for identifying the address of the next data element to be read from the RAM memory. The contents of the write and read pointers are compared and an offset value generated therefrom. The offset value is compared with the programmed offset value, and a signal is generated indicating the RAM memory is ready to be read when the offset value is greater than or equal to the programmed offset value.

BRIEF DESCRIPTION OF THE DRAWINGS

FIGS. 7A–7B 8A–8B, 9A–9C, 10A–10C, and 11A–11B form a circuit diagram showing an example of a five bit Gray code offset generator which may be used as the offset generator in FIG. 1.

DESCRIPTION OF A PREFERRED EMBODIMENT

Figure 1:
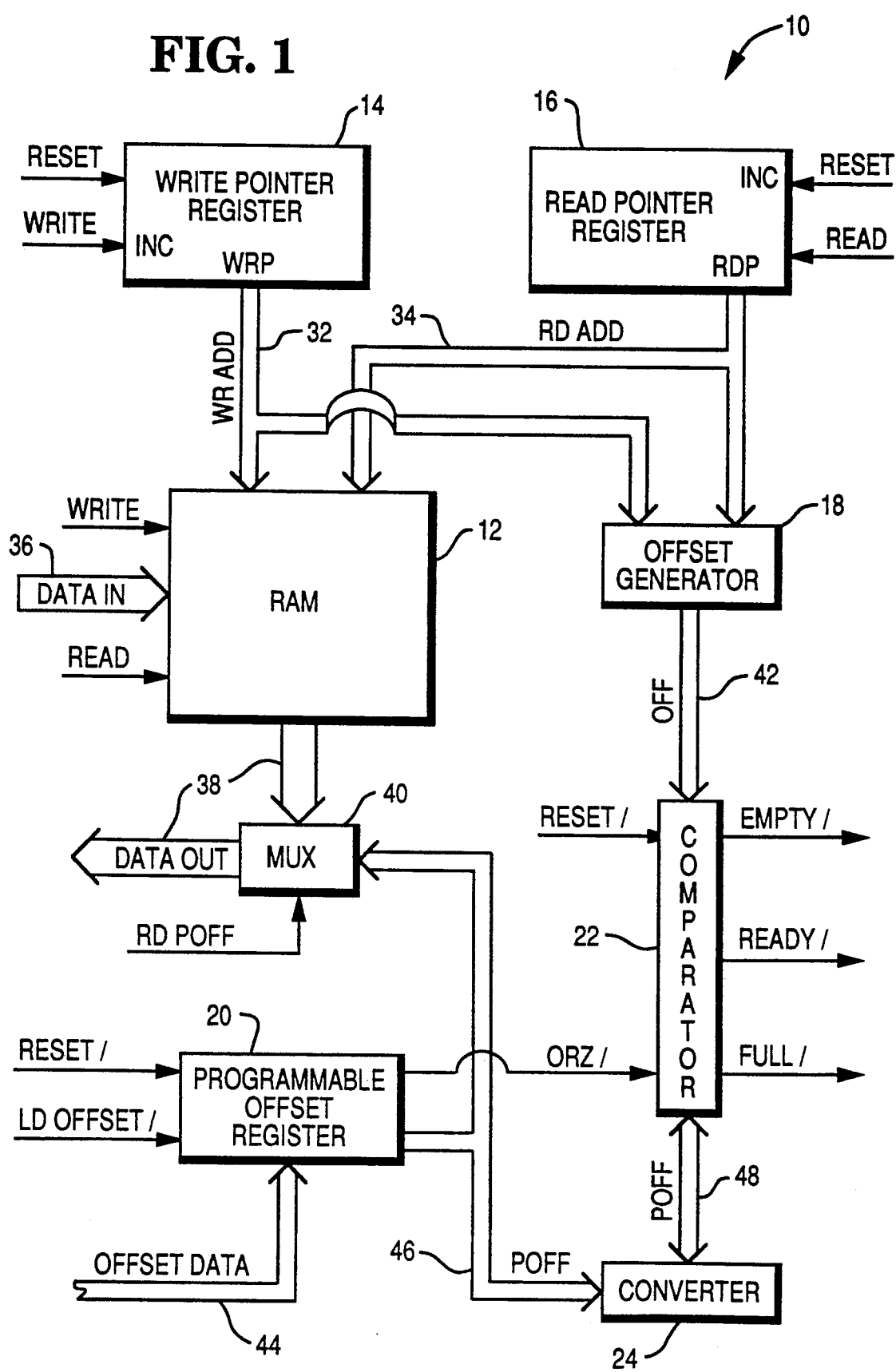
FIG. 1 block diagram of a FIFO memory system according to form of the present invention.

FIG. 1 shows a block diagram of a FIFO memory system 10 according to one form of the present invention. System 10 includes a RAM memory 12, a write pointer register 14, a read pointer register 16, an offset generator 18, a programmable offset register 20, and a comparator 22. There are two embodiments of the present invention described herein. The first involves the use of binary signals in a synchronous environment (hereinafter referred to as the binary system), and the second involves minimum change coded signals (hereinafter referred to as the minimum change system). As used herein, the term "minimum change code" refers to a code having the property that all successive code words differ in only one digit. Minimum change codes are sometimes referred to as cyclic codes. The minimum change system may also include a converter 24 as will be discussed more thoroughly hereinafter.

Briefly, in operation, write and read pointer registers 14 and 16 track the current write and read addresses, respectively, of data stored in RAM 12. These current addresses are provided to offset generator 18 which determines an offset value representing the amount of data stored in RAM 12. A programmed offset value is loaded into programmable offset register 20. Comparator 22 generates an EMPTY/, or FULL/ signal when RAM 12 is empty or full, respectively. Comparator 22 generates a READY/ signal indicating that RAM 12 is ready to be read when the amount of data in RAM 12 is greater than or equal to the programmed offset value. It should be noted that, as-used herein, the symbol "/" following a signal name indicates that the signal is active low. This should not be considered as limiting the invention, but is employed only to completely describe the best mode in practicing the subject invention.

When a data element is to be written into RAM 12 (DATA IN), RAM 12 is enabled by a WRITE signal received on a control line, and the data element is written into RAM 12 at an address (WR ADD) provided by write pointer register 14. Write pointer register 14 is incremented upon the receipt of the WRITE signal, and generates at an output thereof the write address (WR ADD) of the next data element to be written into RAM 12. Write pointer register 14 also stores the address of the next data element to be written into RAM 12.

When a data element is to be read from RAM 12 (DATA OUT), RAM 12 is enabled by a READ signal received on a control line, and the data element is read from RAM 12 at an address (RD ADD) provided by read pointer register 16. Read pointer register 16 is incremented upon the receipt of the READ signal, and generates at an output thereof the read address (RD ADD) of the next data element to be read from RAM 12. Read pointer register 16 also stores the address of the next data element to be read from RAM 12.

Figure 6C:
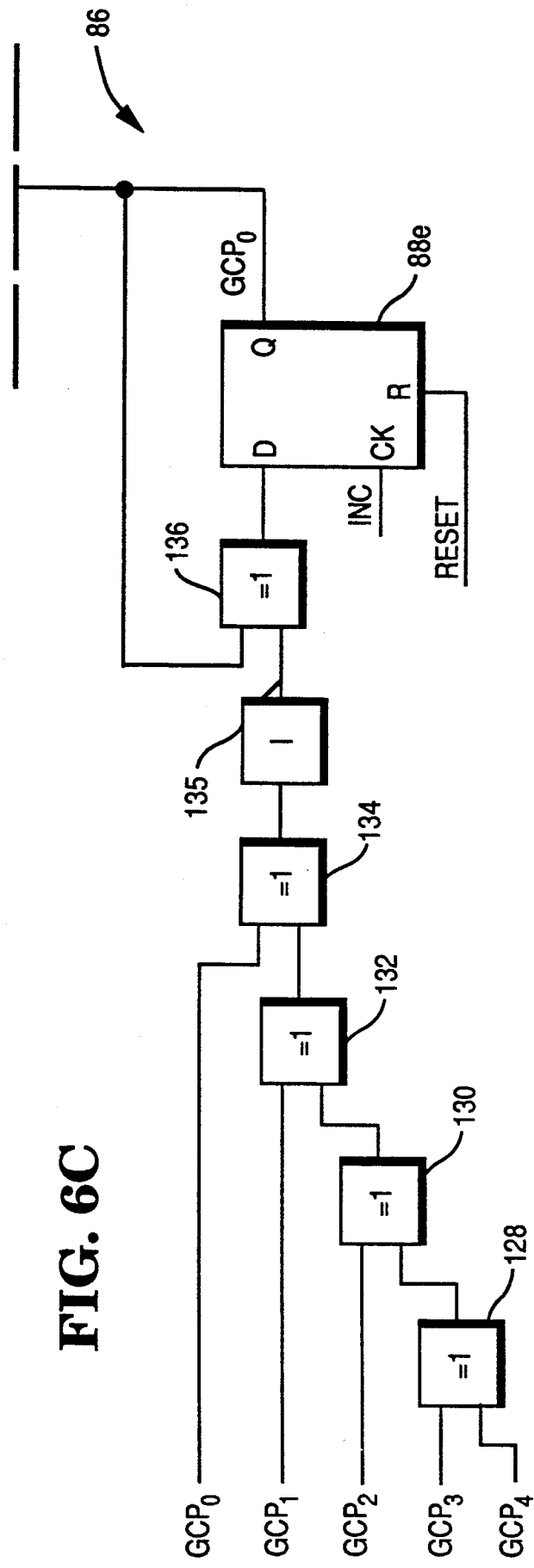
FIGS. 6A–6C show a circuit diagram of a five bit Gray code pointer register which may be used as the write or read pointer register shown in FIG. 1.
Figure 11A:
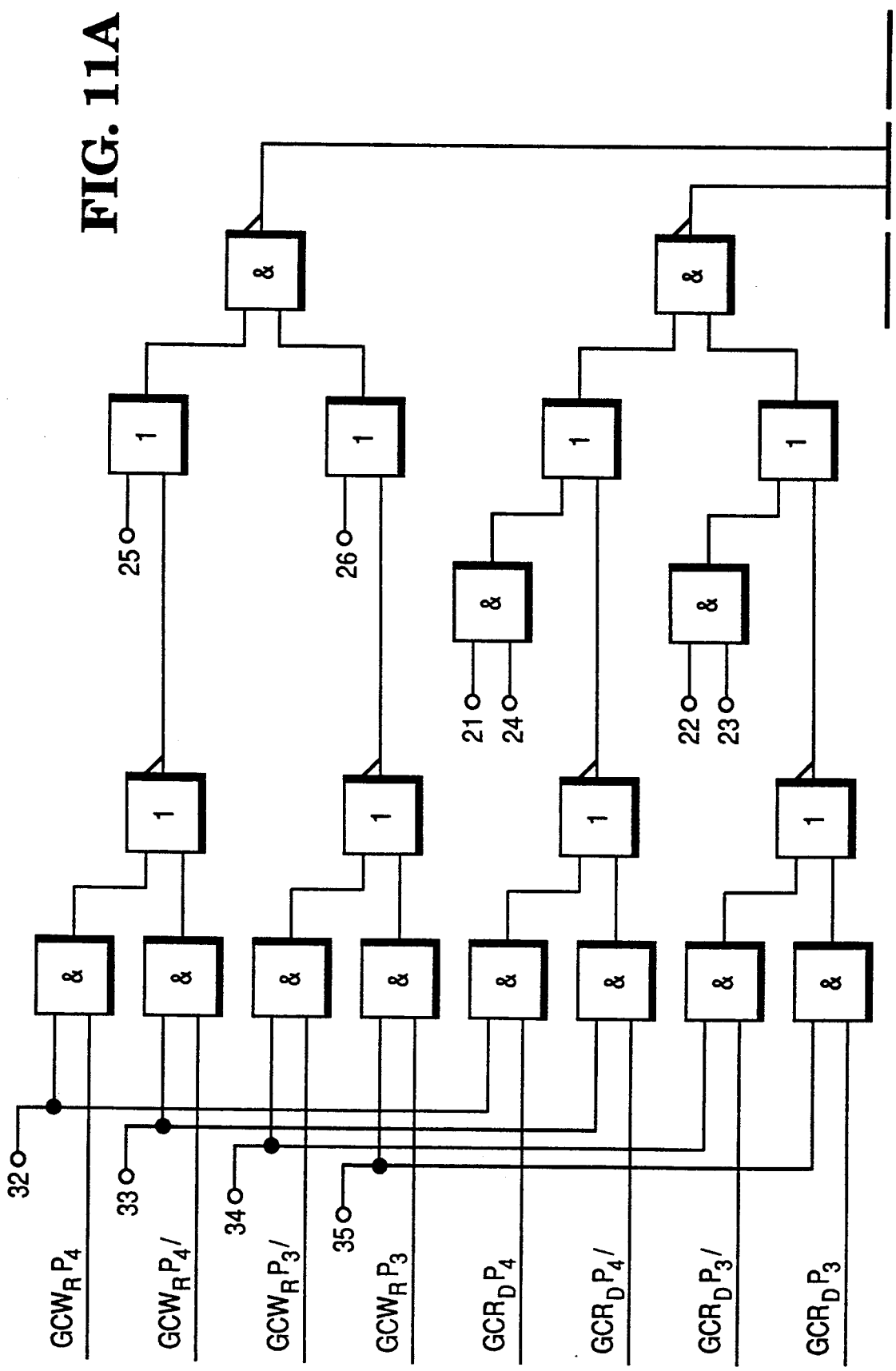
Figure 11B:
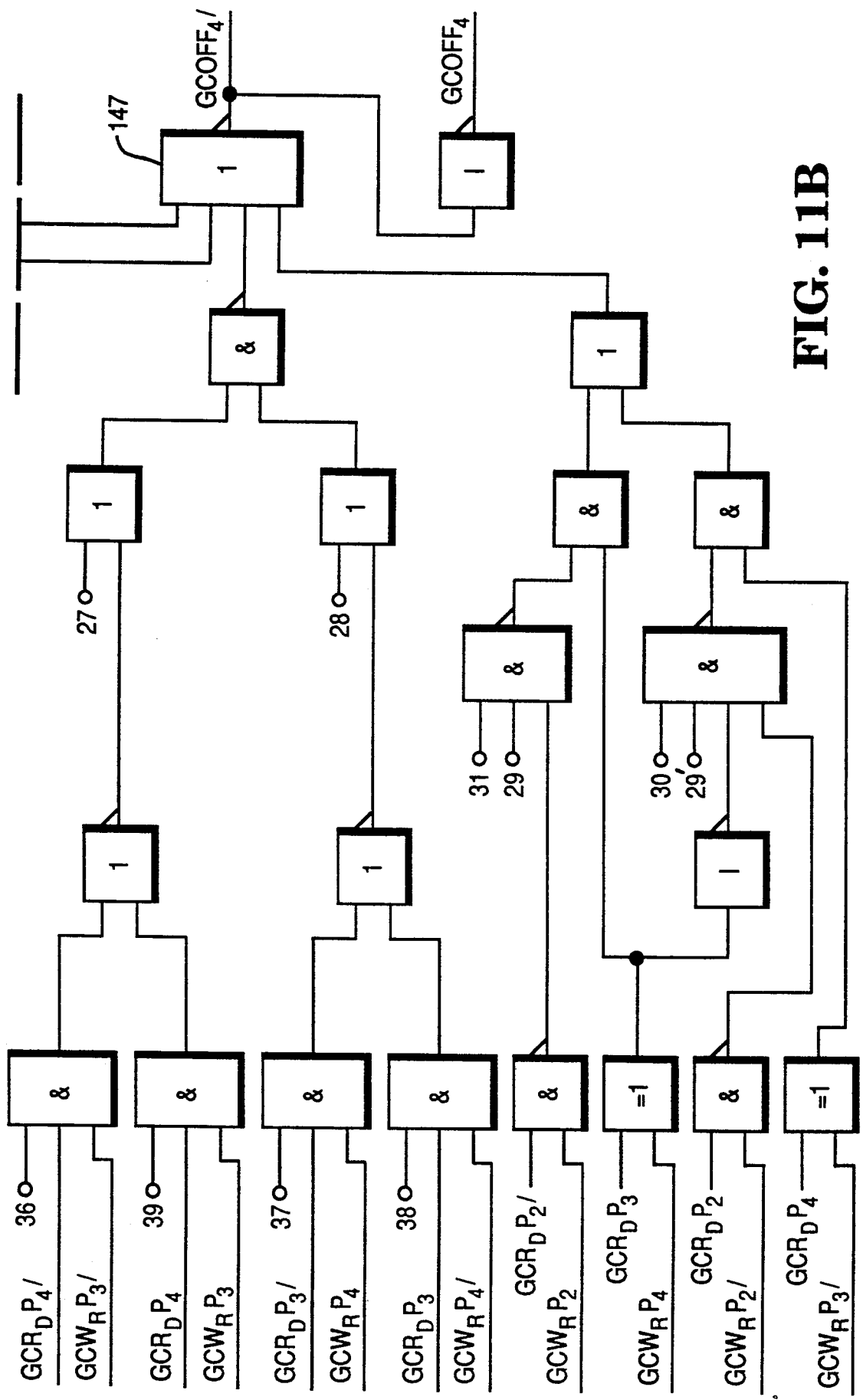

The contents of write pointer register (WR ADD) and read pointer register 16 (RD ADD) are provided to offset generator 18. WR ADD and RD ADD are compared in offset generator 18 and an offset value or signal (OFF), representing the amount of occupied memory space in RAM 12, is generated and transferred to comparator 22. In the binary system, write and read pointer registers 14 and 16 are binary counters and offset generator 18 is a binary subtracter with OFF=WR ADD−RD ADD. In the minimum change system, write and read pointer registers 14 and 16 count in minimum change code and offset generator 18 performs in minimum change code an equivalent binary subtraction of WR ADD and RD ADD and thereby generate a minimum change coded OFF signal. An example of a write or read pointer register 14 or 16 for a minimum change system utilizing Gray code is shown in FIG. 6A–6C, and an offset generator 18 utilizing Gray code is shown in FIGS. 714 11.

Figure 12:
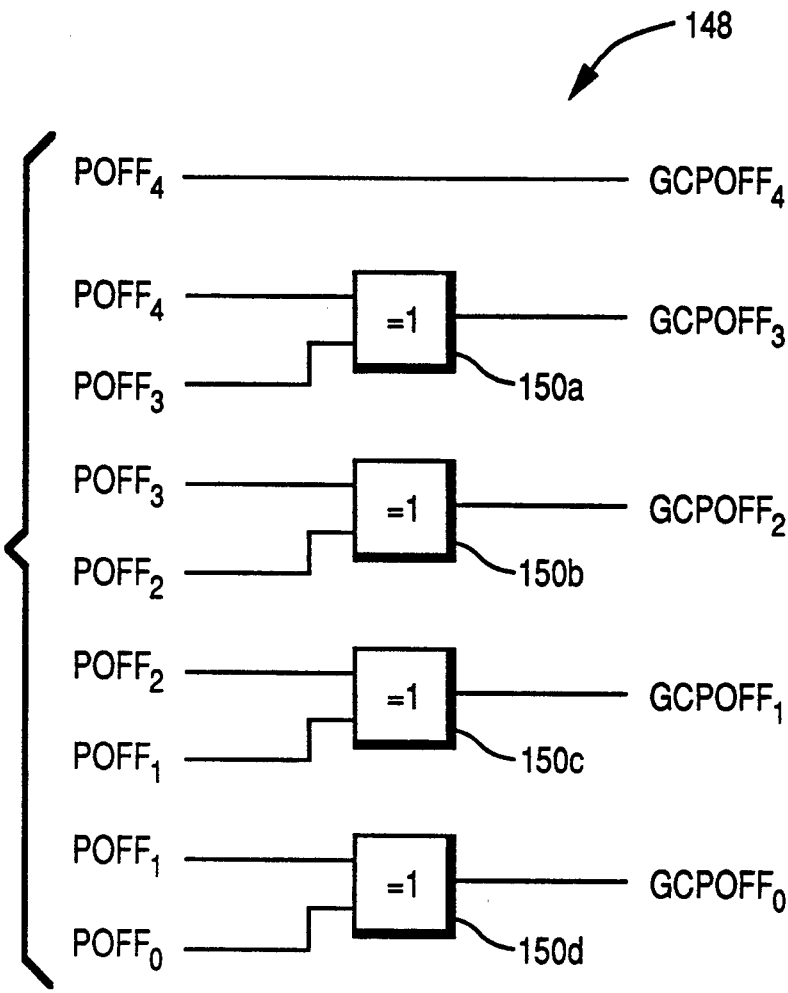
FIG. 12 is a circuit diagram showing an example of a binary to Gray code converter which may be used as the converter in FIG. 1.

The programmed offset value which is loaded into programmable offset register 20 represents the amount of data to be stored in RAM 12 before the ready signal is given. Typically, this will be less than full, but may be varied according to the needs of the particular system or application in which the memory system 10 of the present invention is to be utilized. For the binary system, the programmed offset signal (POFF) is transferred directly from register 20 to comparator 22. For the minimum change system, the programmed offset signal may be stored in register 20 in either minimum change or binary code. If POFF is stored in minimum change code, it is transferred directly to comparator 22. If POFF is stored in binary, converter 24 (which connects offset register 20 to comparator 22) will convert the binary number into minimum change code and transfer the result to comparator 22. One form of a converter 24 for converting binary to minimum change code is shown in FIG. 12.

Figure 3:
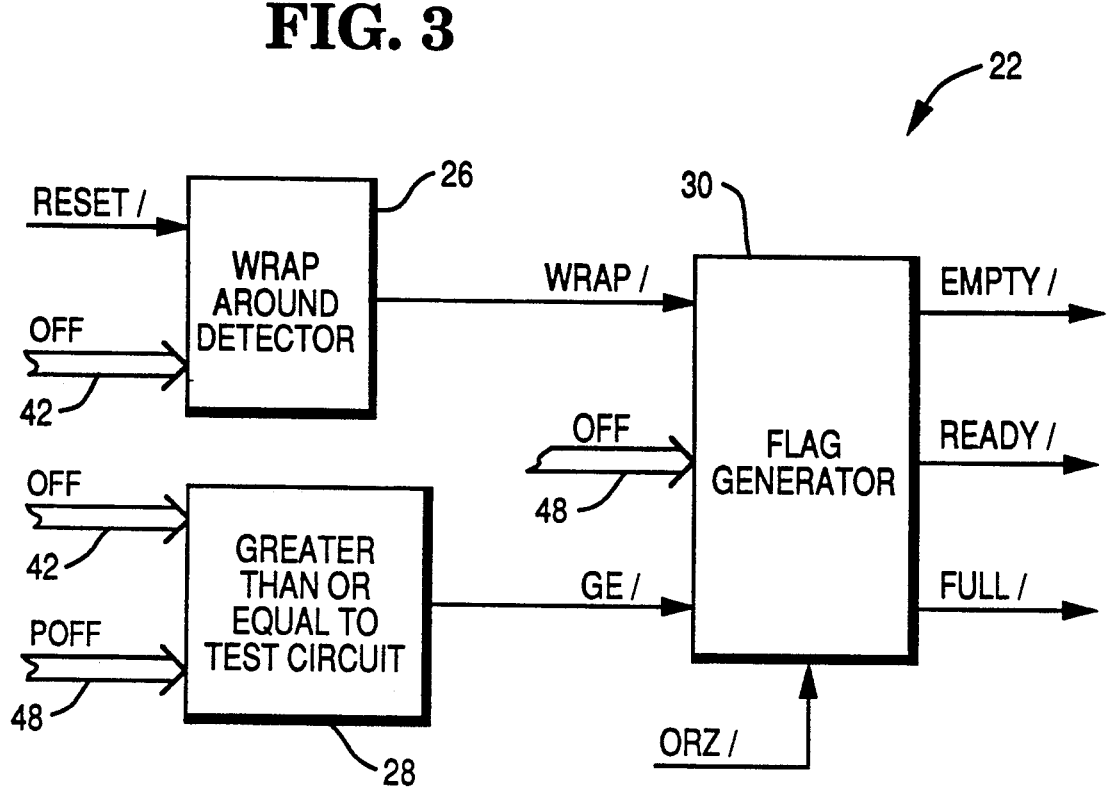
FIG. 3 diagram of the comparator shown in FIG. 1.

Comparator 22 compares the offset signal (OFF) with the programmed offset signal (POFF) and generates a READY signal when OFF is greater than or equal to POFF. Referring to FIG. 3, comparator 22 includes a wrap around detector 26, a greater than or equal to test circuit 28, and a flag generator 30. The purpose of the wrap around detector 26 is to eliminate ambiguity in the meaning of OFF=0. Since OFF=0 can mean either RAM 12 is empty or full, wrap around detector 26 tracks OFF and monitors changes therein to determine if RAM 12 is approaching full or empty. Just before RAM 12 is full, detector 26 generates an active low signal WRAP/, and when RAM 12 is not full, the WRAP/ signal from detector 26 is an inactive high signal. Greater than or equal to test circuit 28 receives both OFF and OFF and determines when OFF is greater than or equal to POFF and generates an active low signal GE/ at such time at an output of circuit 28. Flag generator 30 is connected to the outputs of detector 26, circuit 28, and offset generator 18 and receives the WRAP/, GE/, and OFF signals, respectively, therefrom. Generator 30 generates a FULL/ signal indicating RAM 12 is full when OFF=0 and WRAP/=0. Generator 30 generates an EMPTY/ signal when OFF=0 and WRAP/=1. Generator 30 generates a READY signal when GE/=0 or when RAM 12 is full.

Referring to FIG. 1, write pointer register 14 receives a RESET signal and a WRITE signal, and generates a WR ADD signal on address bus 32. Address bus 32 is connected to an input of RAM 12 and offset generator 18. Read pointer register 16 receives a RESET signal and a READ signal, and generates a RD ADD signal on address bus 34. Address bus 34 is connected to an input of RAM 12 and offset generator 18. RAM 12 receives the WRITE and READ signals from control lines, and receives DATA from data bus 36. As noted previously, RAM 12 is dual ported having both an input data bus 36 and an output data bus 38 which allows simultaneous reads and writes to RAM 12. DATA is read out of RAM 12 on data bus 38 after first passing through multiplexer (MUX) 40. Offset generator 18 receives the WR ADD and RD ADD signals and generates an offset (OFF) signal on bus 42.

Programmable offset register 20 receives RESET/ and LD OFFSET/ signals, and receives OFFSET DATA from data bus 44. Although not shown, data bus 44 may be connected to data bus 36 so that only a single data bus may be required for the present system, and so that OFFSET DATA may be transmitted to register 20 on data bus 36. OFFSET DATA is loaded into register 20 when register 20 is enabled by receipt of a control signal (LD OFFSET). Register 20 stores OFFSET DATA and provides the same on bus 46 in the form of the programmed offset (POFF) signal. Bus 46 is connected to an input of MUX 40 and to an input of converter 24. MUX 40 is provided with a control line for receiving a read programmed offset (RD POFF) signal which selects the POFF signal on bus 46 to be output on data bus 38. As noted previously, converter 24 is not required for the binary system, in which case bus 46 is connected directly to an input of comparator 22. For the minimum change system, where OFFSET DATA is stored in register 20 in binary form, bus 46 is connected to an input of converter 24 and the output of converter 24 is connected to an input of comparator 22 through bus 48.

Comparator 22 receives the OFF and POFF signals on busses 42 and 48, respectively. Comparator 22 also receives an offset register zero (ORZ/) from programmable offset register 20 and a RESET signal. Three signals are generated by comparator 22—EMPTY/, READY/, and FULL/.

Figure 2:
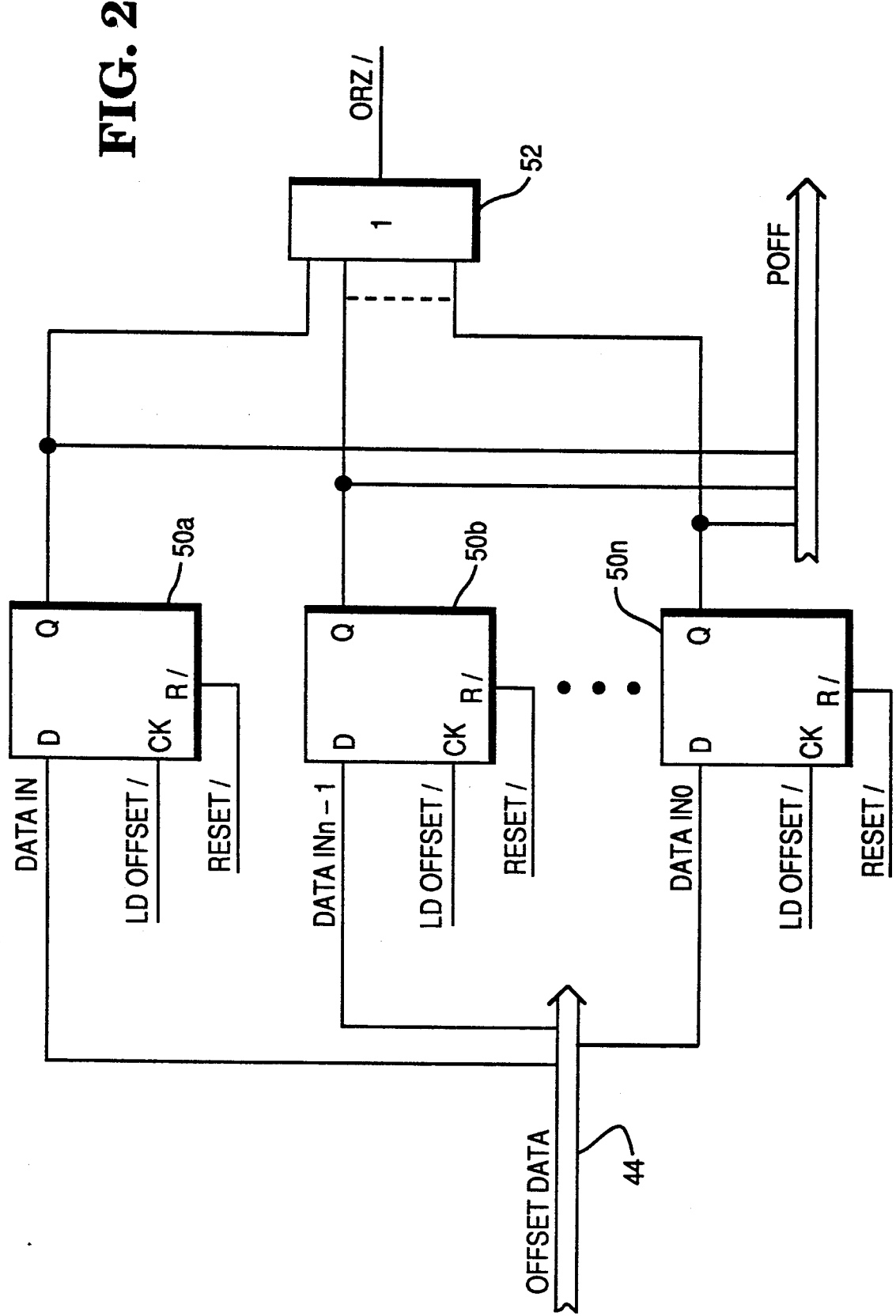
FIG. 2 is a circuit diagram showing an example of a programmable offset register for use with the FIFO memory system shown in FIG. 1.

FIG. 2 shows more detail of programmable offset register 20. The OFFSET DATA is stored in a plurality of parallel D type flipflops $50a, 50b, \ldots, 50n$. The number of flipflops 50, i.e., the value of n, is such that $2^n$ is the same as the number of addressable locations in RAM 12. Each flipflop 50 has a D input for receiving one of the parallel lines of OFFSET DATA from data bus 44. The CK input receives the control signal LD OFFSET/. Whenever LD OFFSET/ is active, OFFSET DATA on data bus 44 is loaded or latched into flipflops 50. OFFSET DATA in flipflops 50 is available on the Q outputs as the programmed offset data POFF. The Q outputs are also connected as inputs to an OR gate 52 which provides an active low output ORZ/ whenever all of the Q outputs are low. The ORZ/ signal is utilized by comparator 22 as will be discussed more fully hereinafter. Each flipflop 50 also receives the RESET/ signal at its R input for resetting the flipflop upon receipt of the signal.

FIG. 3 shows a block diagram of comparator 22. Comparator 22 comprises wrap around detector 26, greater than or equal to test circuit 28, and flag generator 30. Wrap around detector 26 receives the offset signal OFF and a RESET/ signal and generates at its output a WRAP/ signal. Greater than or equal to test circuit 28 receives both the offset signal OFF and the programmed offset signal POFF and at its output a GE/ (greater than or equal to) signal. The GE/ signal is asserted whenever OFF is greater than or equal to POFF. Flag generator 30 receives as inputs WRAP/, GE/, ORZ/, and OFF, and generates EMPTY/, READY/, AND FULL/ signals.

Figure 4:
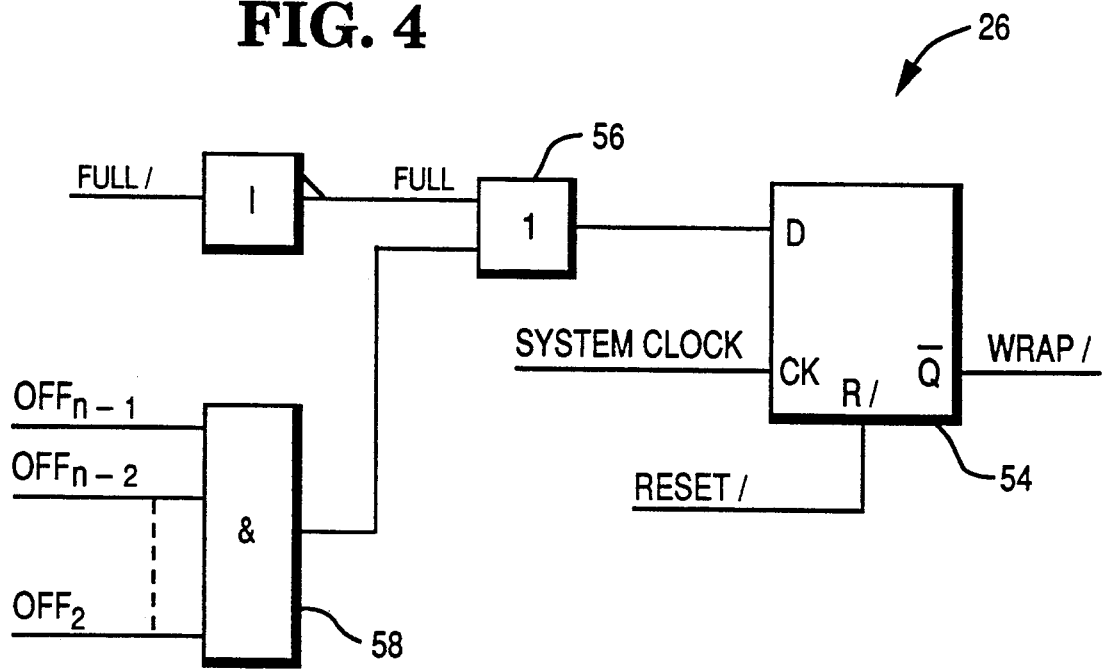
FIG. 4 is a circuit diagram showing an example of a binary wrap around detector for use in the comparator shown in FIG. 3.

FIG. 4 is a circuit diagram of a wrap around detector 26 such as may be used in a binary system. Detector 26 includes a D type flipflop 54, an OR gate 56, and an AND gate 58. AND gate 58 receives as inputs the high n-1 bits of the OFF signal, i.e., $OFF_n, OFF_{n-1}, \ldots, OFF_2$. OR gate 56 receives as inputs the output of AND gate 58 and the FULL signal. The D input of flipflop 54 is connected to the output of OR gate 56. The CK input to flipflop 54 receives a SYSTEM CLOCK signal. This synchronizes the operation of wrap around detector 28 and prevents glitching of the output such as may occur in a binary system where more than a single bit of the OFF signal may change for each read or write operation. Flipflop 54 provides the WRAP/ signal at its Q/ output. When flipflop 54 is initially reset, WRAP/ is inactive high. As RAM 12 fills up, OFF will increment until finally each bit $OFF_n, \ldots OFF_2$ will equal 1 and the output of AND gate 58 will go high. At this point WRAP/ will become active low.

Figure 5:
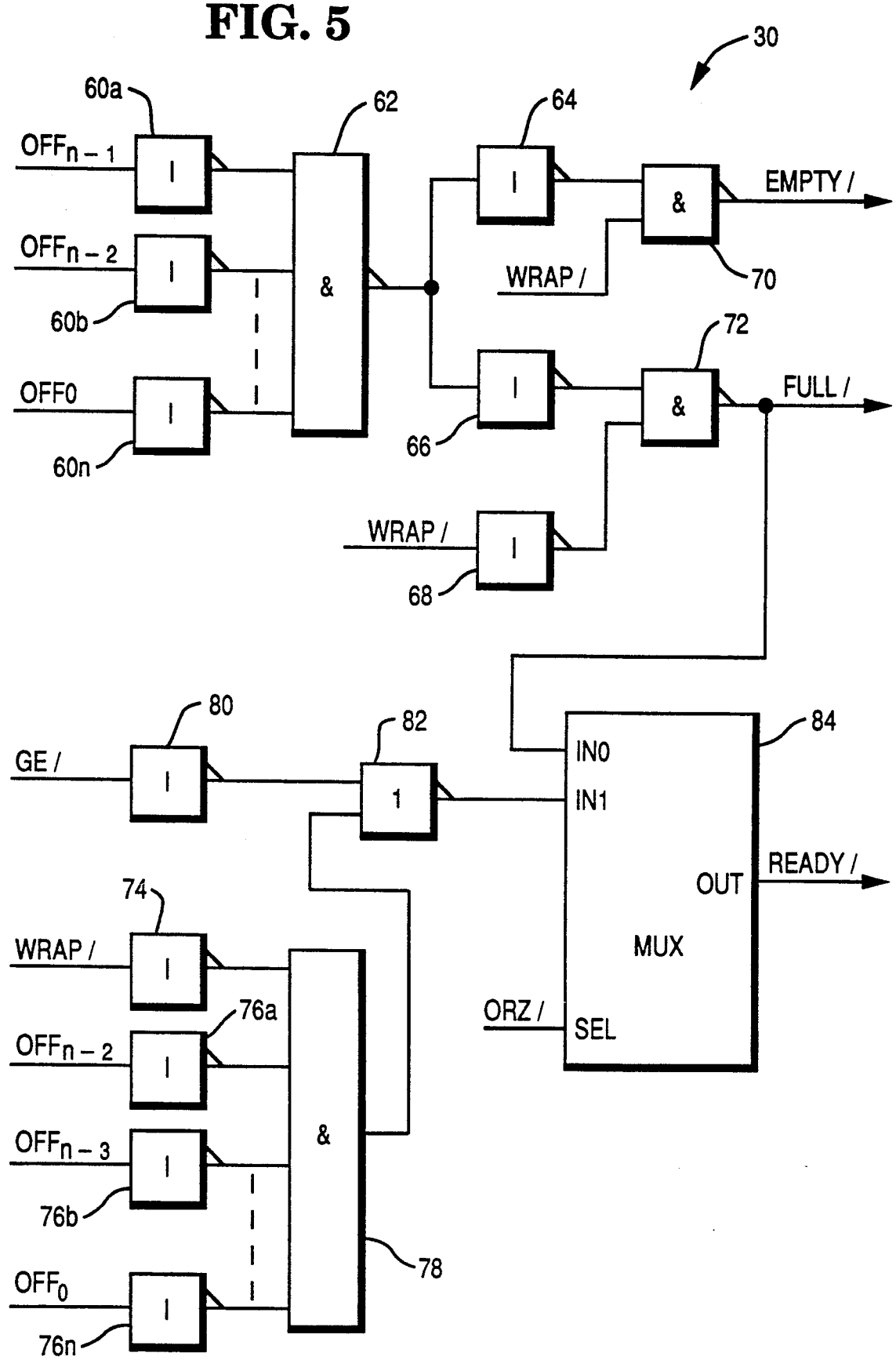
FIG. 5 is a circuit diagram showing an example of a flag generator for use in the comparator shown in FIG. 3.

FIG. 5 shows a circuit diagram of flag generator 30 such as may be employed in either the binary or minimum change system according to the present invention. Flag generator 30 includes inverters $60a, 60b, \ldots, 60n$, NAND gate 62, inverters 64, 66 and 68, NAND gates 70 and 72, inverter 74, inverters $76a, 76b, \ldots, 76n$, AND gate 78, inverter 80, NOR gate 82, and multiplexer (MUX) 84. NAND gate 62 receives as inputs the n bits of the OFF signal inverted by inverters $60a, 60b, \ldots, 60n$. NAND gate 70 receives as inputs the output of NAND gate 62 inverted by inverter 64 and the WRAP/ signal. NAND gate 62 provides at its output the EMPTY/ signal which is asserted when RAM 12 is empty. It will be noted that EMPTY/ will only be asserted when OFF is zero and WRAP/ is inactive high. NAND gate 72 receives as inputs the WRAP/ signal inverted by inverter 68 and the output of NAND gate 62 inverted by inverter 68 and It will be noted that FULL/ will only be asserted when OFF is zero and WRAP/ is active low. AND gate 78 receives as inputs the WRAP/ signal inverted by inverter 74, and the high n-1 bits of the OFF signal inverted by inverters $76a, 76b, \ldots, 76n$. NOR gate 82 receives as inputs the output of AND gate 78 and the GE/ signal inverted by inverter 80. MUX 84 receives as a first input the FULL/ signal and as a second input the output of NOR gate 82. The select input of MUX 84 is the ORZ/ signal. When ORZ/ is active low (meaning that the programmed offset is zero), the first input is selected. This means that READY/ will only be asserted when FULL/ is asserted. In other words, a ready signal will only be given when RAM 12 is full. If ORZ/ is inactive high (meaning a value has been loaded in the offset register), the second input is selected, meaning the ready signal will only be given when OFF is greater than or equal to POFF. When RAM 12 is full, the offset is zero ($OFF_0=0, \ldots, OFF_{n-1}=0$), WRAP/=0, and GE/=1. The output of AND gate 78 will be 1, so the output of NOR gate 82 will be 0. Thus, gate 78 effectively holds the READY/ signal from multiplexer 84 active low while RAM 12 is full.

As discussed previously, there are two embodiments of the present invention disclosed and discussed herein, namely, a binary system and a minimum change system. At this point the discussion the binary system is essentially complete. To recap with reference to FIG. 1, it has been disclosed that write pointer register 14 and read point register 16 are conventional binary counters, and offset generator 18 is a conventional binary subtracter. RAM 12 and MUX 40 are also conventional with RAM 12 being a dual ported RAM in a preferred embodiment. Programmable offset register 20 is disclosed and discussed with reference to FIG. 2. Converter 24 is not required for the binary system. Comparator 22 is disclosed and discussed with reference to FIG. 3. A binary wrap around detector is disclosed and discussed with reference to FIG. 4. A binary greater than or equal to test circuit is a conventional binary comparator circuit. A flag generator is disclosed and discussed With respect to the minimum change system, an example of a minimum change code write or read pointer register will be discussed with reference to FIGS. 6A-6C. A minimum change code offset register 18 will be discussed with reference to FIGS. 7-11. A binary to minimum change code converter 24 will be discussed with reference to FIG. 12. A minimum change code greater than or equal to test circuit will be discussed with reference to FIG. 13, and a minimum change code wrap around detector will be discussed with reference to FIG. 14.

Figure 6:
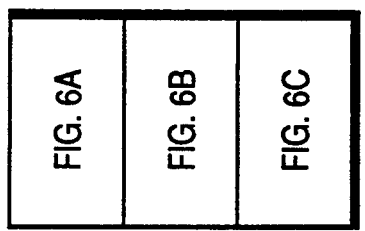
Figure 6B:
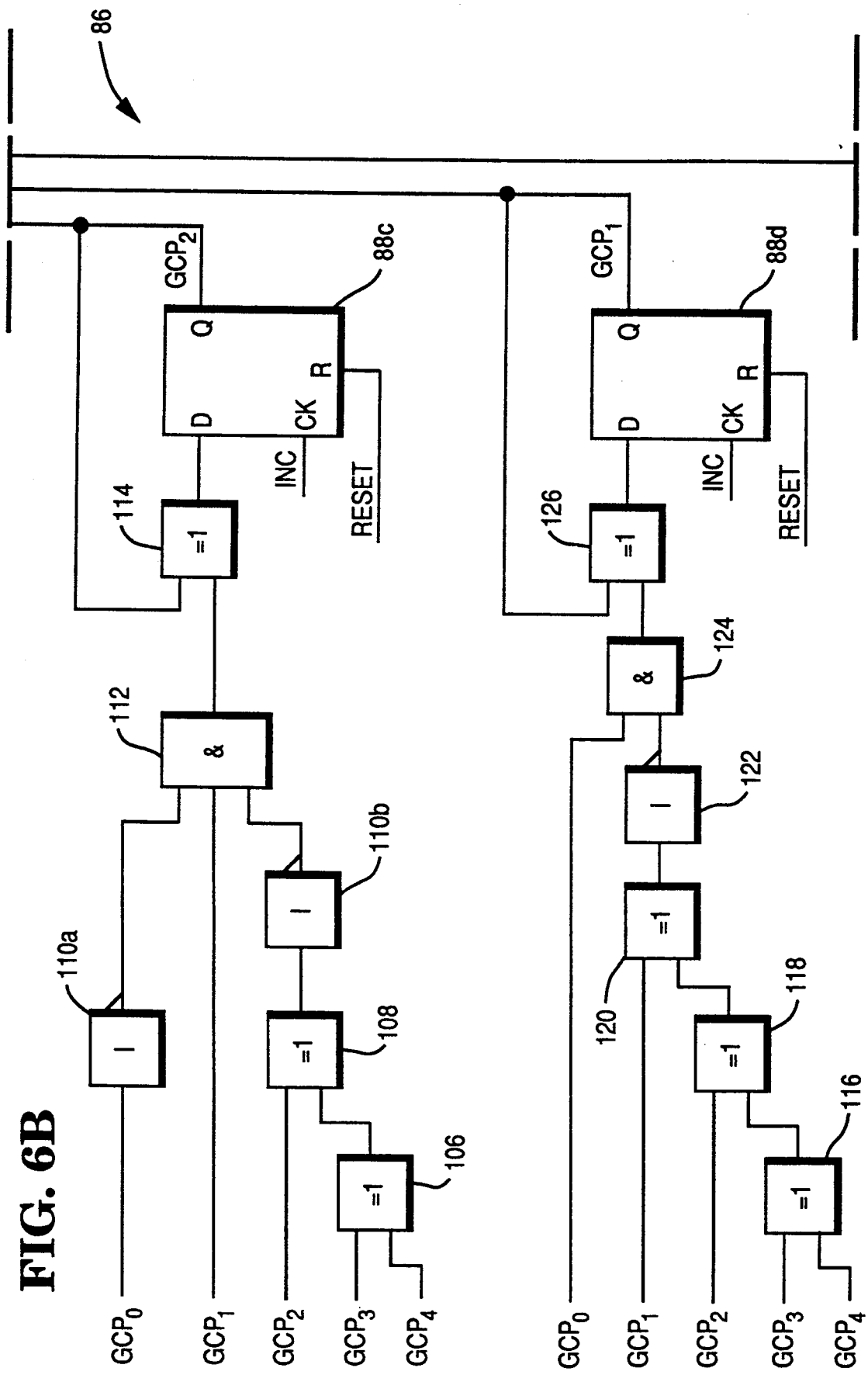
Figure 7A:
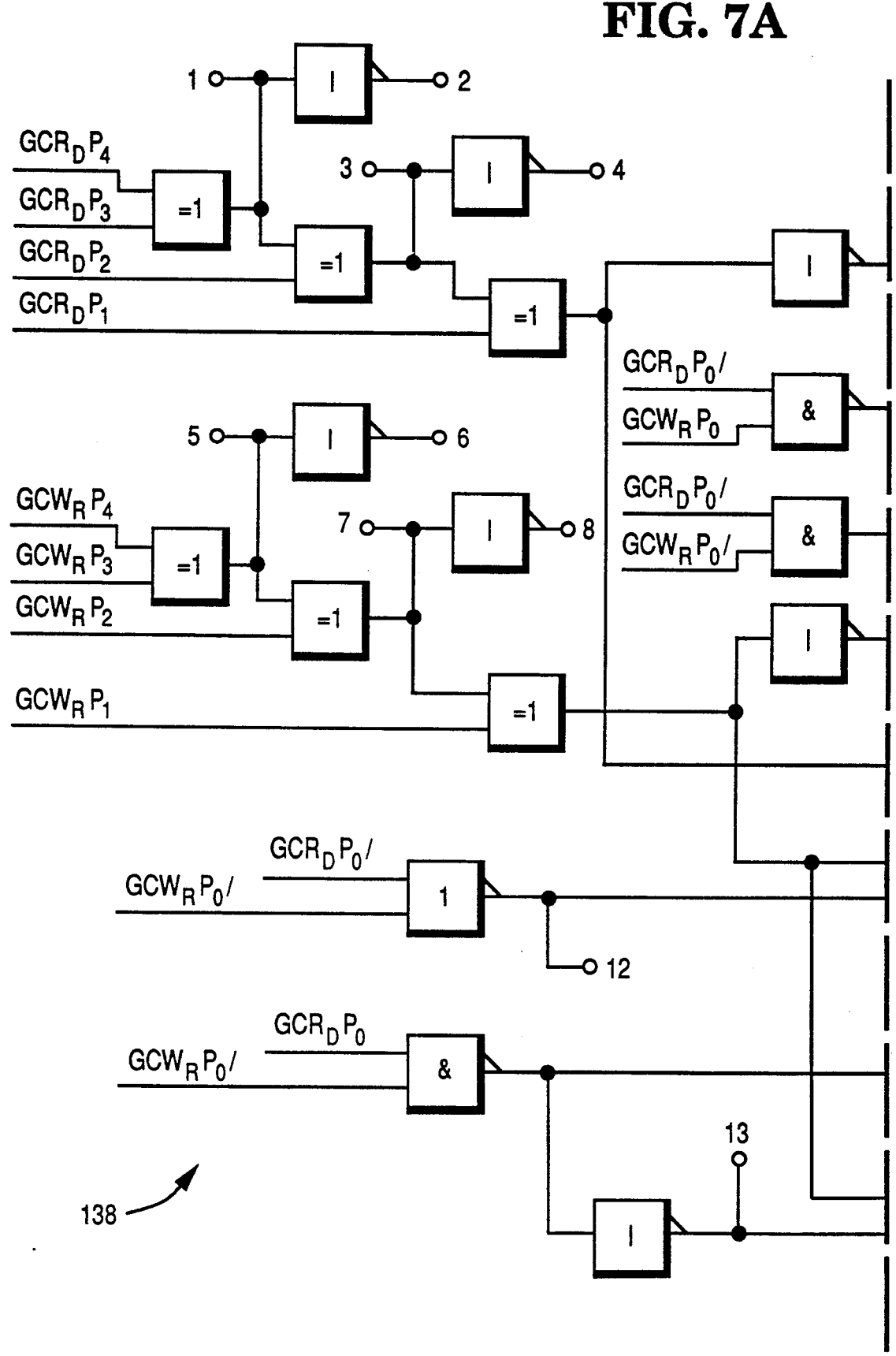
Figure 7B:
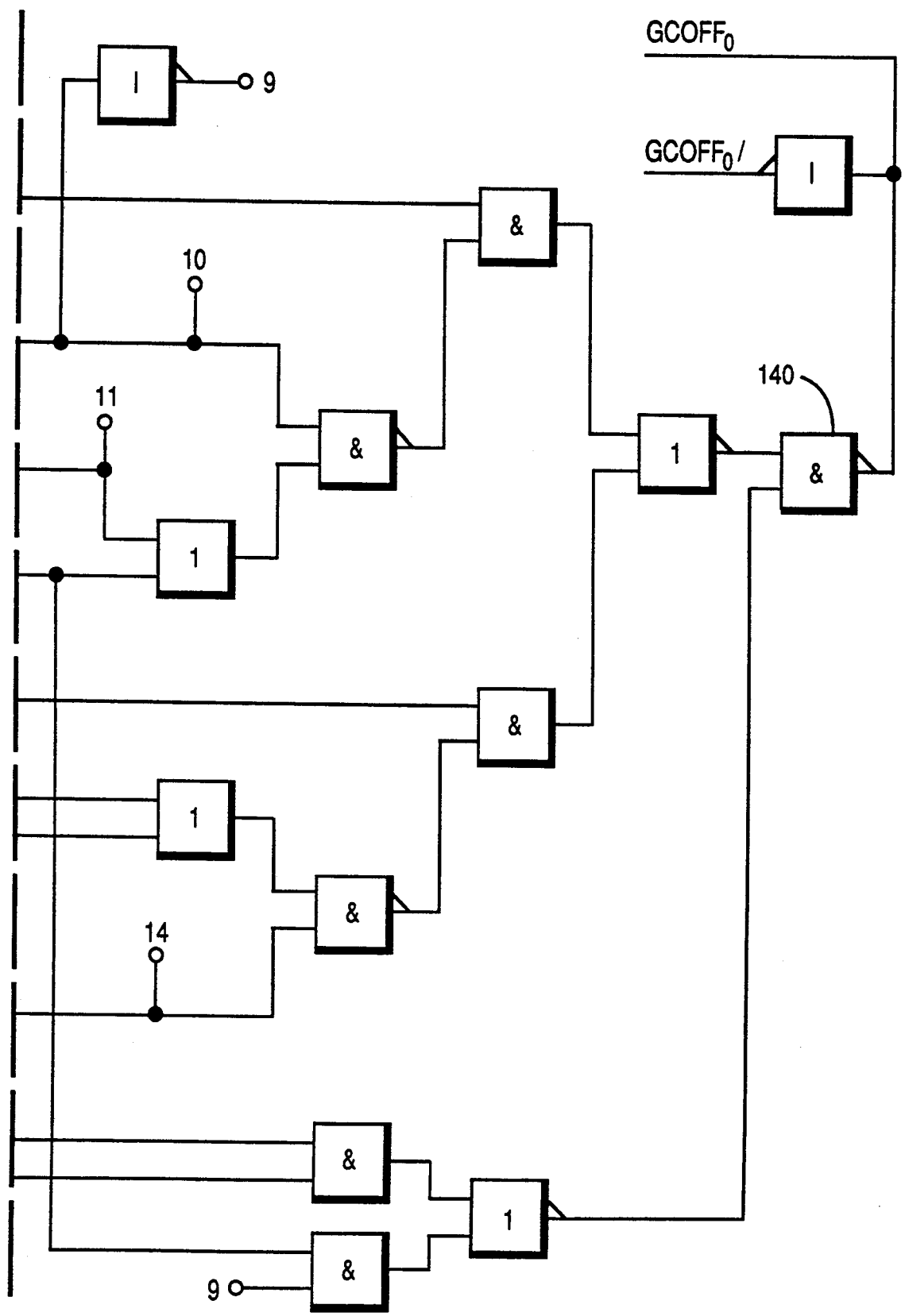
Figure 8A:
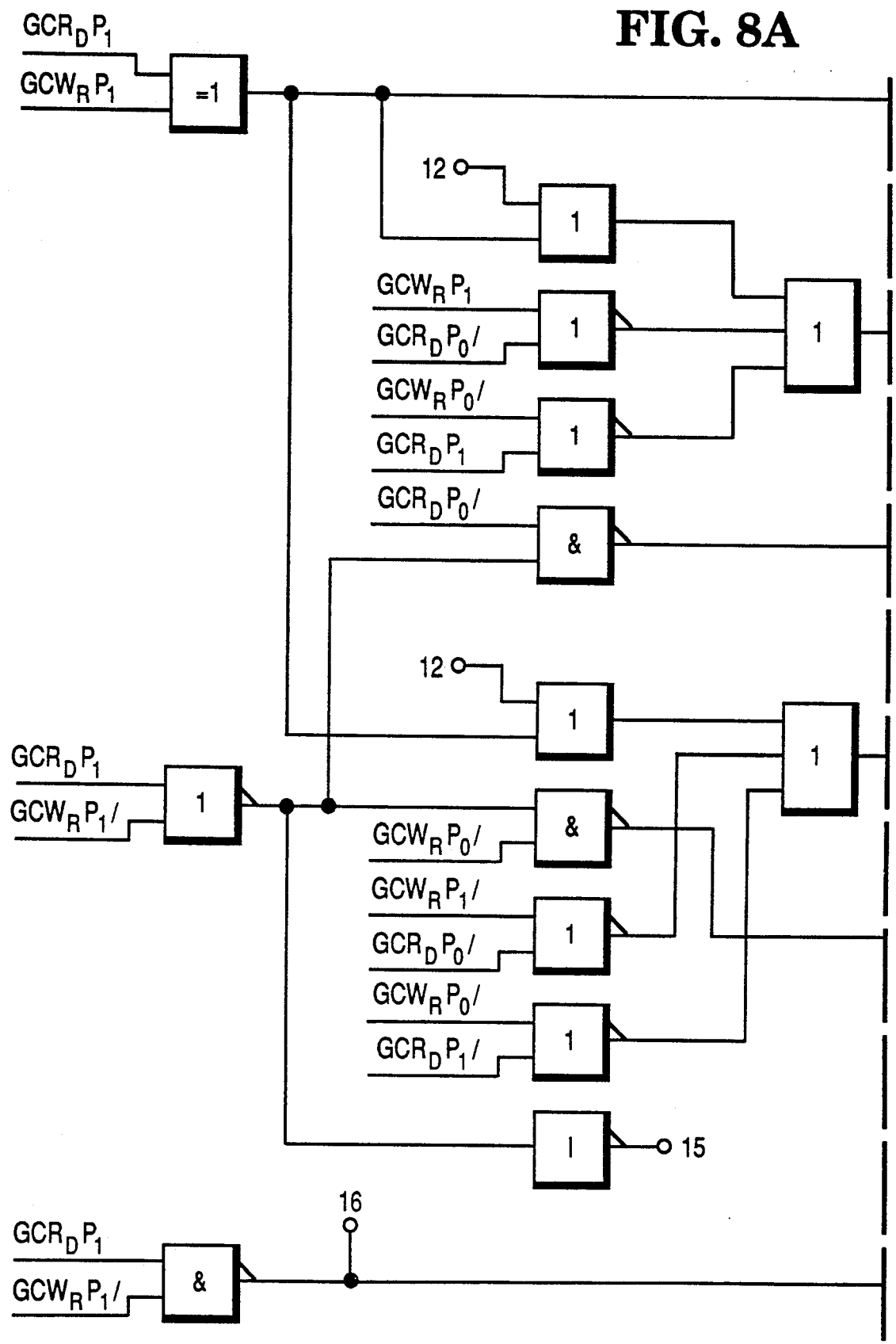
Figure 8B:
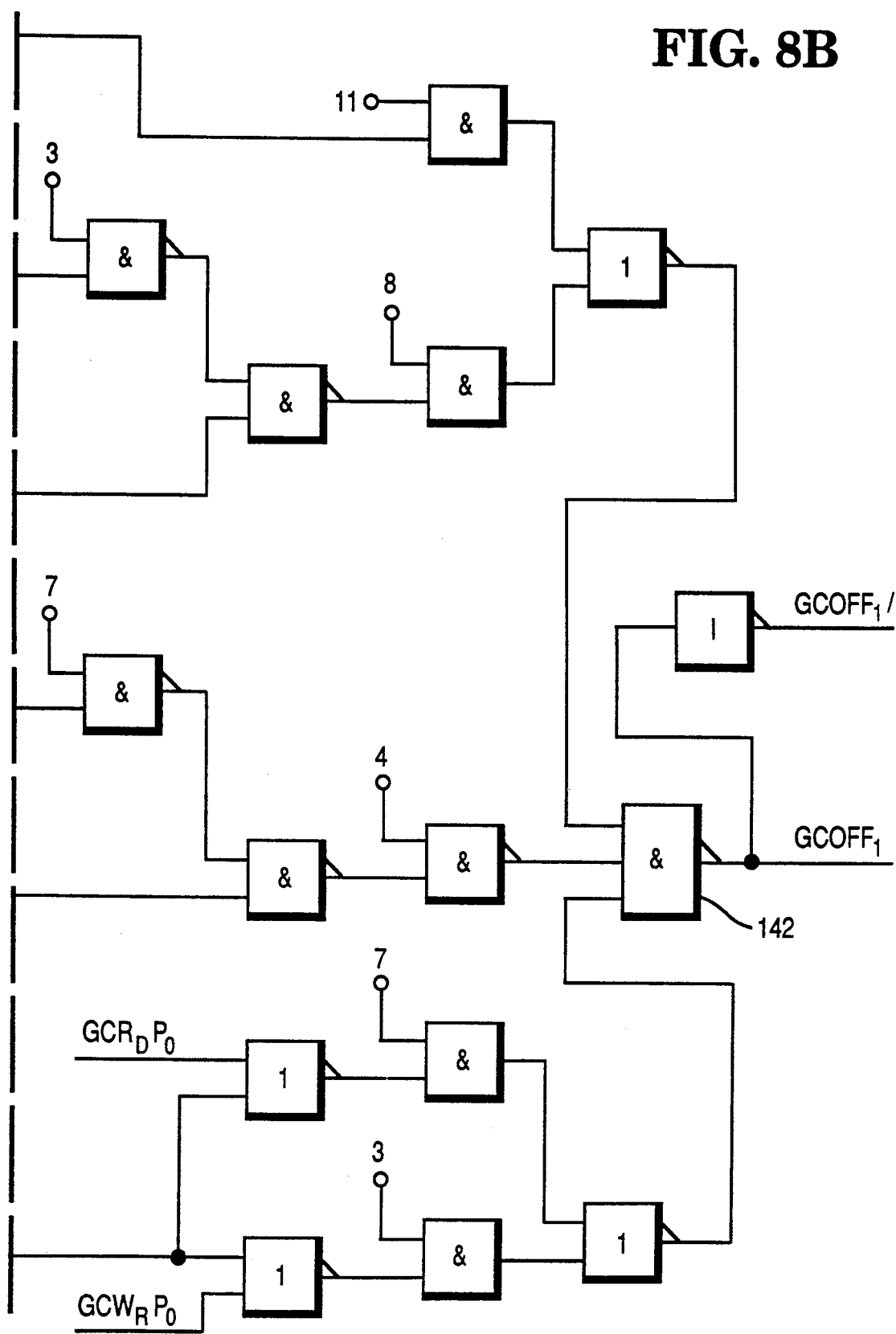
Figure 9C:
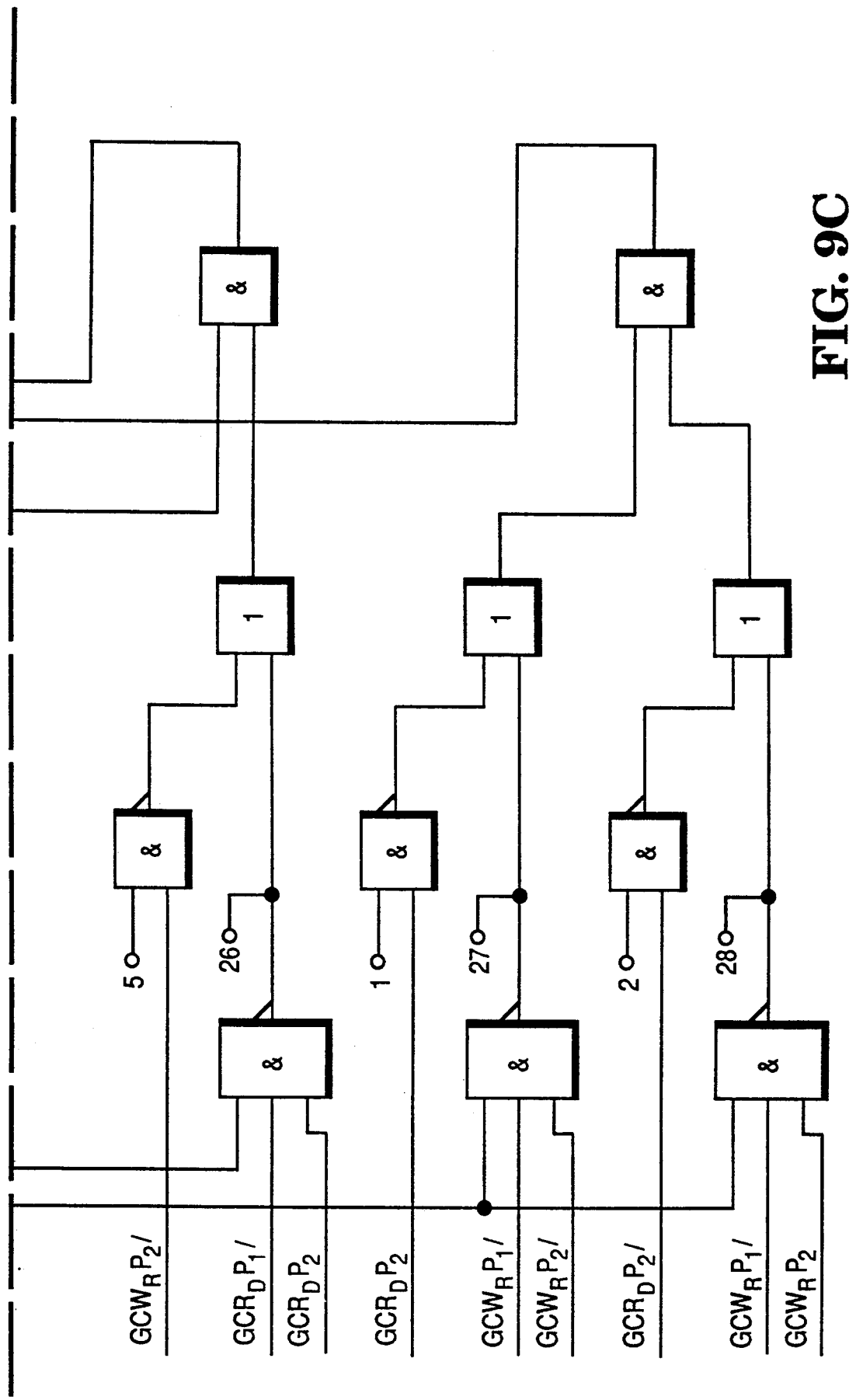
Figure 10B:
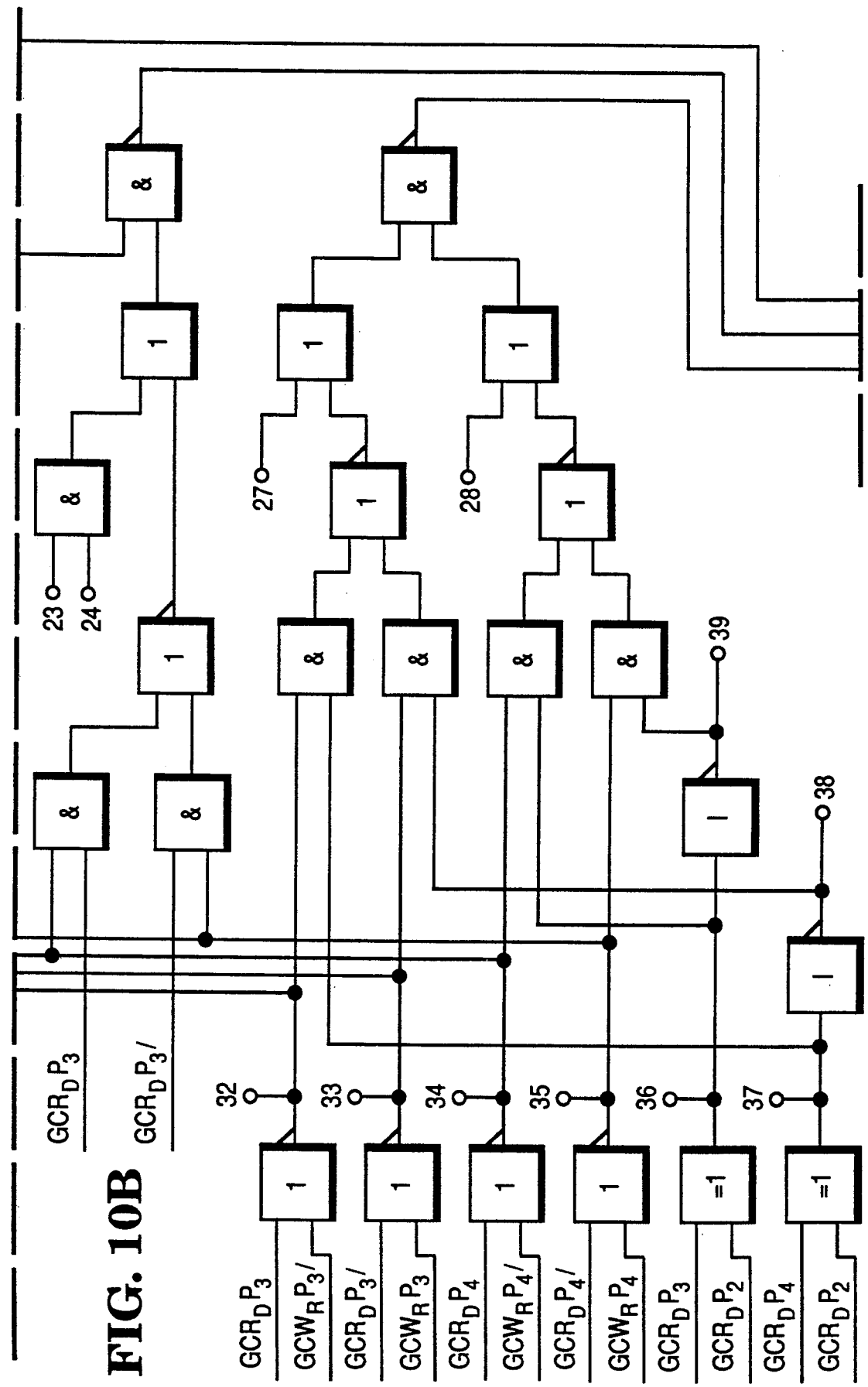
Figure 10C:
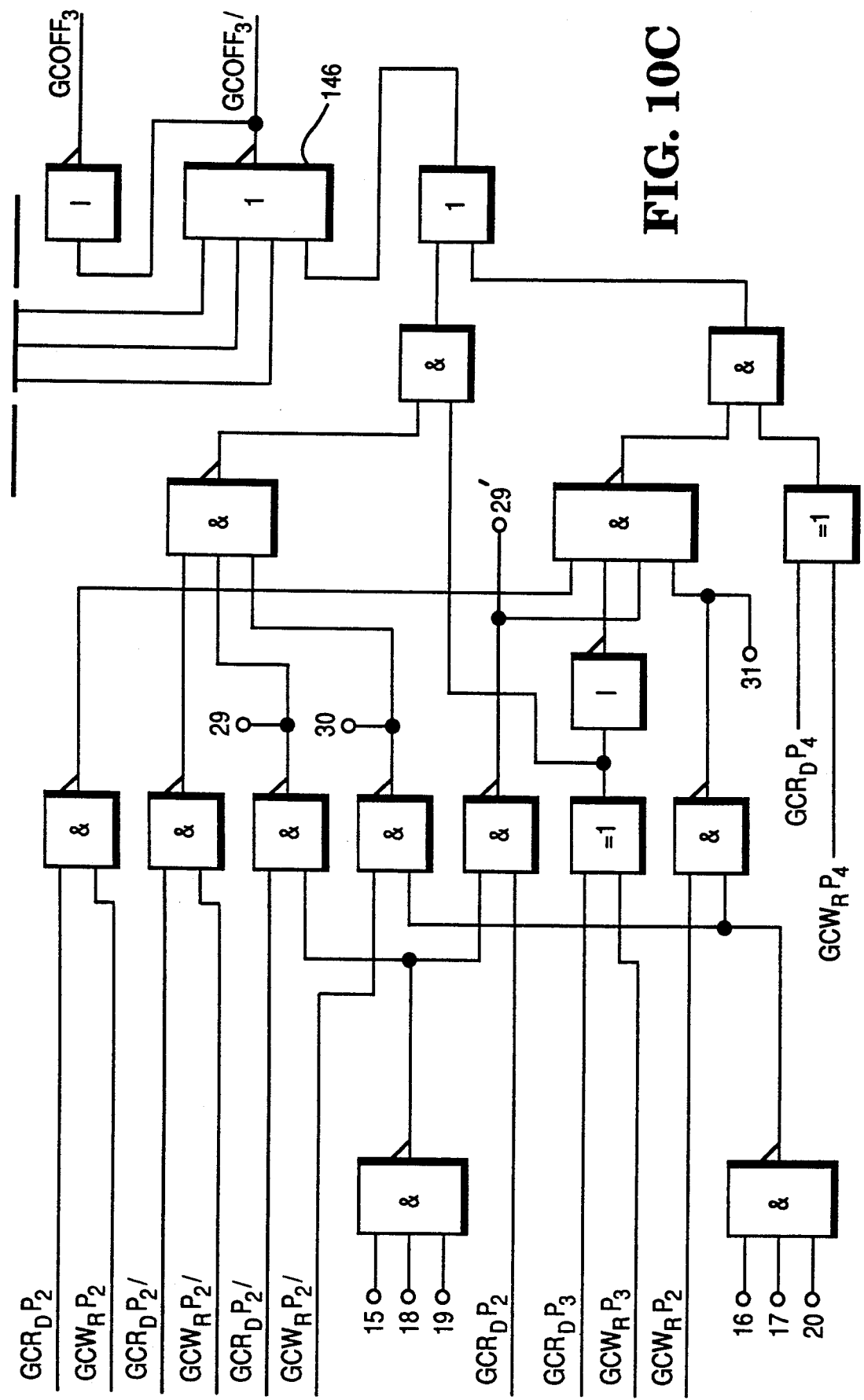

Refer now to FIGS. 6A-6C which are connected according to the map of FIG. 6 shown on the same sheet as FIG. 6C. A circuit diagram of a Gray code pointer register such as may be used in a minimum change system for write pointer register 14 or read pointer register 16 is disclosed. Gray code is well known in the art as a type of minimum change code. Minimum change code differs from binary in that each incremental advance in a count only changes one bit whereas binary code may change any number of bits. For example, the numbers 1, 2, and 3 are represented as 01, 10, and 11, respectively, in binary. Note that in counting from 1 to 2 in binary both bits are changed. In contrast, 1, 2, and 3 in Gray code are 01, 11, and 10. Note that in each incremental increase only one bit changes. The following table shows the complete five-bit Gray code sequence and, for comparison, the equivalent binary notation.

| Decimal Number | Gray code | Binary |
| --- | --- | --- |
| 0 | 00000 | 00000 |
| 1 | 00001 | 00001 |
| 2 | 00011 | 00010 |
| 3 | 00010 | 00011 |
| 4 | 00110 | 00100 |
| 5 | 00111 | 00101 |
| 6 | 00101 | 00110 |
| 7 | 00100 | 00111 |
| 8 | 01100 | 01000 |
| 9 | 01101 | 01001 |
| 10 | 01111 | 01010 |
| 11 | 01110 | 01011 |
| 12 | 01010 | 01100 |
| 13 | 01011 | 01101 |
| 14 | 01001 | 01110 |
| 15 | 01000 | 01111 |
| 16 | 11000 | 10000 |
| 17 | 11001 | 10001 |
| 18 | 11011 | 10010 |
| 19 | 11010 | 10011 |
| 20 | 11110 | 10100 |
| 21 | 11111 | 10101 |
| 22 | 11101 | 10110 |
| 23 | 11100 | 10111 |
| 24 | 10100 | 11000 |
| 25 | 10101 | 11001 |
| 26 | 10111 | 11010 |
| 27 | 10110 | 11011 |
| 28 | 10010 | 11100 |
| 29 | 10011 | 11101 |
| 30 | 10001 | 11110 |
| 31 | 10000 | 11111 |

The use of Gray code in the subject invention prevents output glitches such as may occur when counting in binary bode. In other words, when more than a single bit in a number changes, one of the bits may change instantaneously before another. This may create momentary errors in operations performed on such numbers. Unless the entire system is to controlled by a clock the output may glitch or provide an incorrect signal in response thereto.

The FIG. 6 embodiment shows a Gray code pointer register 86 for N=5. Register 86 includes five D type flipflops 88a, 88b, 88c, 88d, and 88e. Each flipflop 88 receives on its CK input an INC (increment) signal. The INC signal is either the WRITE or READ signal shown in FIG. 1 depending upon whether register 86 is being used as write pointer register 14 or read pointer register 16, respectively. Receipt of the INC signal increments register 86 by changing one of the five GCPi bits. The INC signal is a typical square wave pulse having a leading and trailing edge. Each flipflop responds to the trailing edge of the INC signal so that register 86 is not incremented until the trailing edge of the INC signal occurs. It should be noted that the INC signal, in the form of either the WRITE or READ signal is also received by RAM 12 (see FIG. 1). In order to assure that data is written into or read out of the correct address in RAM 12, RAM 12 responds to the leading edge of the WRITE or READ signal. Thus, data is stored or read from RAM 12 before the address in printer register 14 or 16 is incremented.

The Q output of each flipflop 88 provides one bit of GCP (Gray code pointer) signal. The GCP signal is equivalent to the WR ADD or RD ADD signal shown in FIG. 1. The D input to each flipflop 88 receives a signal which is a function of the GCP signal from the Q output of all of the flipflops 88. The signals are processed through a matrix of logic gates. For example, as shown in FIG. 6A, register 86 includes EX OR gate 90, inverters 92a, 92b, 92c, and 92d, AND gate 94 and EX OR gate 96. EX OR gate 90 receives as inputs the Q output of flipflops 88a and 88b. The input of inverter 92d receives the output of EX OR gate 90. The inputs of inverters 92a, 92b, and 92c receive as inputs the Q outputs of flipflops 88e, 88d, and 88c, respectively. AND gate 94 receives as inputs the outputs of inverters 92a, 92b, 92c, and 92d. EX OR gate 96 receives as inputs the output of AND gate 94 and the Q output of flipflop 88a. The D input of flipflop 88a receives the output of EX OR gate 96. Register 86 further includes EX OR gate 98, inverters 100a, 100b, and 100c, AND gate 102 and EX OR gate 104. EX OR gate 98 receives as inputs the Q output of flipflops 88a and 88b. The input of inverter 100c receives the output of EX OR gate 98. The inputs of inverters 100a, and 100b receive as inputs the Q outputs of flipflops 88e, and 88d, respectively. AND gate 102 receives as inputs the outputs of inverters 100a, 100b, and 100c, and the output of flipflop 88c. EX OR gate 104 receives as inputs the output of AND gate 102 and the Q output of flipflop 88b. The D input of flipflop 88b receives the output of EX OR gate 104.

Referring to FIG. 6B, register 86 further includes EX OR gates 106 and 108, inverters 110a, and 110b, AND gate 112 and EX OR gate 114. EX OR gate 106 receives as inputs the Q output of flipflops 88a and 88b EX OR gate 108 receives as inputs the output of EX OR gate 106 and the Q output of flipflop 88c. The input of inverter 110b receives the output of EX OR gate 108. The input of inverter 110a receives as its input the Q output of flipflop 88e. AND gate 112 receives as inputs the outputs of inverters 110a, and 110b, and the output of flipflop 88d. EX OR gate 114 receives as inputs the output of AND gate 112 and the Q output of flipflop 88c. The D input of flipflop 88c receives the output of EX OR gate 114. Register 86 further includes EX OR gates 116, 118, and 120, inverter 122, AND gate 124 and EX OR gate 126. EX OR gate 116 receives as inputs the Q output of flipflops 88a and 88b. EX OR gate 118 receives as the output of EX OR gate 116 and the Q output of flipflop 88c. EX OR gate 120 receives as inputs the output of EX OR gate 118 and the Q output of flipflop 88d. The input of inverter 122 receives the output of EX OR gate 120. AND gate 124 receives as inputs the output of inverter 122, and the output of flipflop 88e. EX OR gate 126 receives as inputs the output of AND gate 124 and the Q output of flipflop 88d. The D input of flipflop 88d receives the output of EX OR gate 126.

Referring to FIG. 6C, register 86 further includes EX OR gates 128, 130, 132, 134 and 136, and inverter 135. EX OR gate 128 receives as inputs the Q output of flipflops 88a and 88b. EX OR gate 130 receives as inputs the output of EX OR gate 128 and the Q output of flipflop 88c. EX OR gate 132 receives as inputs the output of EX OR gate 130 and the Q output of flipflop 88d. EX OR gate 134 receives as inputs the output of EX OR gate 132 and the Q output of flipflop 88e. Inverter 135 receives as an input the output of EX OR gate 134. EX OR gate 136 receives as inputs the output of inverter 135 and the Q output of flipflop 88e. The D input of flipflop 88e receives the output of EX OR gate 136.

FIGS. 7-11 are a logic circuit diagram of a Gray code offset generator 138 such as may be employed as offset generator 18 in FIG. 1. As with FIG. 6, the FIG. 7-11 embodiment is for N=5. FIGS. 7A-7B show logic circuitry for generating $GCOFF_0$ (the first of five bits of the Gray code offset signal), FIGS. 8A-8B show logic circuitry for generating $GCOFF_1$, FIG. 9A-9C show logic circuitry for generating $GCOFF_2$, FIGS. 10A-10C show logic circuitry for generating $GCOFF_3$, FIGS. 11A-11B show logic circuitry for generating $GCOFF_4$. Generator 138 receives as inputs WR ADD and RD ADD signals from write pointer register 14 and read pointer register 16 shown in FIG. 1. Since generator 138 operates in Gray code, registers 14 and 16 may be of the type shown and described in FIG. 6. Thus, the external signals received by generator 138 are designated $GCW_RP$ (Gray code write pointer) and $GCR_DP$ (Gray code read pointer) The five bits comprising $GCW_RP$ are denoted as $GCW_RP_0$, $GCW_RP_1$, $GCW_RP_2$, $GCW_RP_3$, and $GCW_RP_4$, and the five bits comprising $GCR_DP$ are denoted as $GCR_DP_0$, $GCR_DP_1$, $GCR_DP_2$, $GCR_DP_3$, and $GC_RDP_4$. Other inputs to circuit elements of generator 138 include the inverted signals $GCW_RP_0/$, $GCW_RP_1/$, $GCW_RP_2/$, $GCW_RP_3$, $GCW_RP_4/$, $GCR_DP_0/$, $GC_RDP_1/$, $GCR_DP_2/$, $GC_RDP_3/$, and $GC_RDP_4/$. The logic gates and their interconnections are clearly shown in FIGS. 7A-7E and will not be discussed in detail herein. It should be noted that the numbered connectors terminating with an open circle depict connections to logic element inputs with similarly numbered circles. Each output bit $GCOFF_0$, $GCOFF_1$, $GCOFF_2$, $GCOFF_3$, and $GCOFF_4$, is provided at an output of NAND gate 140, 142, 144, and NOR gate 146, and 147, respectively. A second inverted output bit $GCOFF_0/$, $GCOFF_1/$, $GCOFF_2/$, $GCOFF_3/$, and $GCOFF_4/$, is also provided by an inverter connected to each output of NAND gates 140, 142, 144, and NOR gates 146, and 147, respectively.

As noted previously, with reference to FIG. 1, converter 24 is not required for the binary system and is employed in the minimum change system when the programmed offset value is stored in register 20 in binary. FIG. 12 shows a circuit diagram of a binary to Gray code converter 148. The embodiment shown is for an N=5. Converter 148 includes a plurality of EX OR gates 150a, 150b, 150c, and 150d. Binary signals are denoted as $POFF_4$, $POFF_3$, $POFF_2$, $POFF_1$, and $POFF_0$, and Gray code signals are denoted as $GCPOFF_4$, $GCPOFF_3$, $GCPOFF_2$, $GCPOFF_1$, and $GCPOFF_0$. The $POFF_4$ signal line is connected directly to the $GCPOFF_4$ signal line. EX OR gate 150a receives a $POFF_4$ and $POFF_3$ and provides $GCPOFF_3$ as an output. EX OR gate 150b receives as inputs $POFF_3$ and $POFF_2$ and provides $GCPOFF_2$ as an output. EX OR gate 150c receives as inputs $POFF_2$ and $POFF_1$ and provides $GCPOFF_1$ as an output. EX OR gate 150d receives as inputs $POFF_1$ and $POFF_0$ and provides $GCPOFF_0$ as an output.

Figure 13:
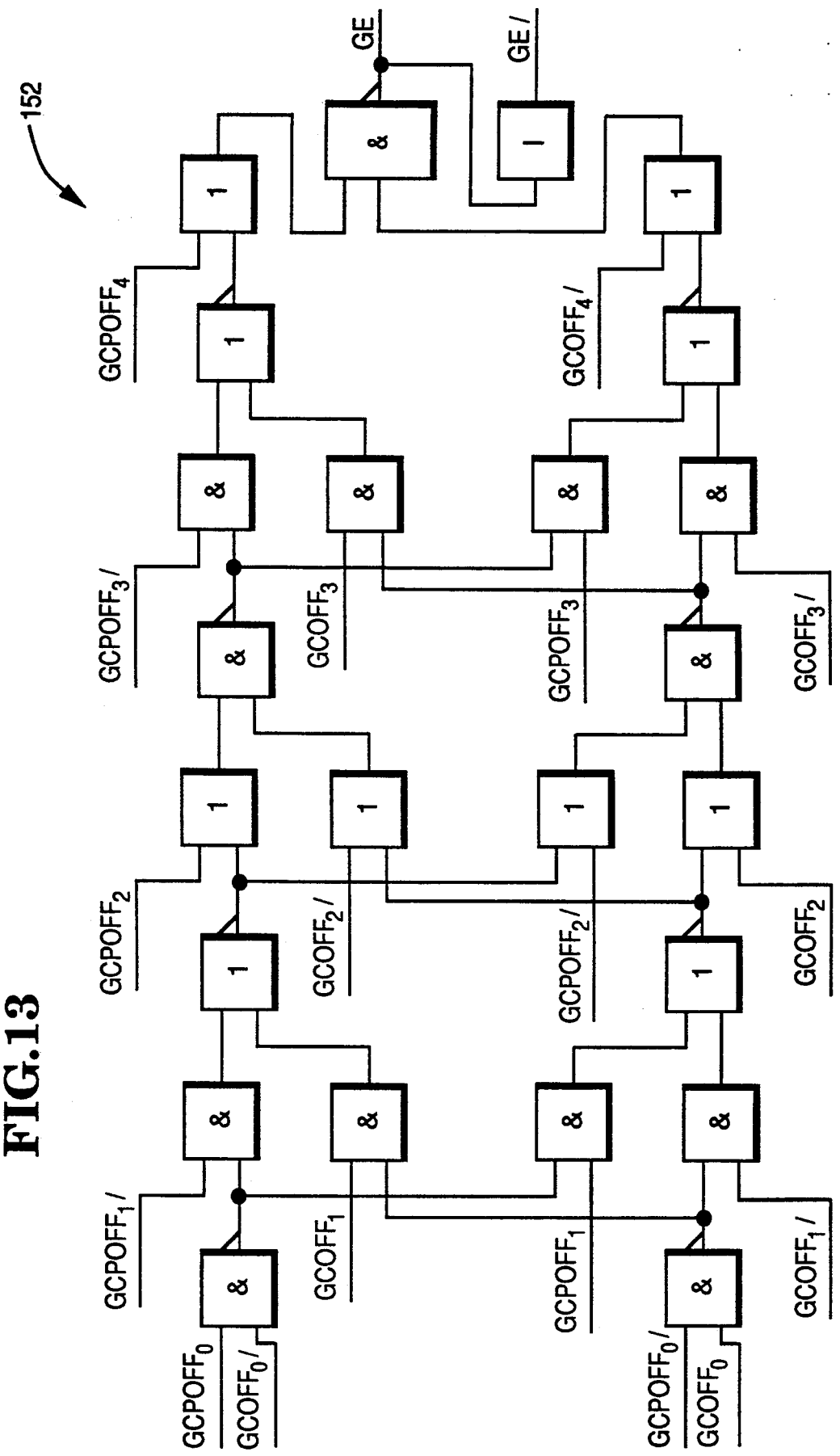
FIG. 13 is a circuit diagram showing an example of a Gray code greater than or equal to circuit which may be comparator shown in FIG. 3.

As discussed previously, comparator 22 as shown in FIGS. 1 and 3, includes wrap around detector 26, greater than or equal to test circuit 28, and flag generator 30. For the minimum change system, a Gray code greater than or equal test circuit 152 is shown in FIG. 13. As with the FIGS. 7-11 embodiment, N=5. Test circuit 152 comprises a plurality of logic gates connected as shown in FIG. 9. It will be noted that the inputs to circuit 152 include the various GCOFF and GCPOFF signals and/or the inverse of such signals. The output of circuit 152 is the GE/ signal which is active low whenever GCOFF is greater than or equal to GCPOFF. The GE/ signal is provided as an input to the flat generator 30 shown in FIG. 5.

Figure 14:
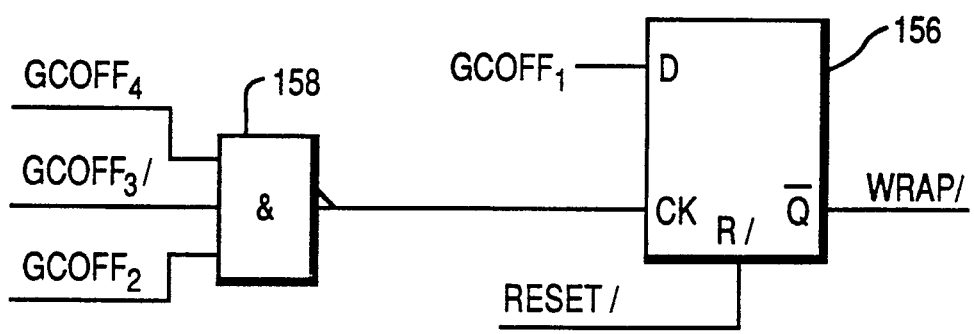
FIG. 14 is a circuit diagram showing an example of a Gray code wrap around detector which may be used in the comparator shown in FIG. 3.

FIG. 14 shows a Gray code wraparound detector 154 such as may be employed in a minimum change system for the wrap around detector 26 shown in FIG. 3. Wrap around detector 154 is illustrates an embodiment for N=5. Detector 154 includes a D type flipflop 156 and a NAND gate 158. NAND gate 158 receives as inputs Gray code offset signals $GCOFF_4$, $GCOFF_3$, and $GCOFF_2$. The output of NAND gate 158 is provided to the CK input of flipflop 156. The $GCOFF_1$ signal is provided to the D input of flipflop 156. The active low WRAP/ signal is provided at the Q/ output of flipflop 156. The WRAP/ signal is provided as an input to the flag generator shown in FIG. 5.

It will be clear to those skill in the art that the present invention is not limited the specific embodiments disclosed and illustrated herein. Nor is the minimum change system embodiment limited to circuits utilizing Gray code . Rather, the invention may be applied equally to circuits utilizing other minimum change codes. Numerous modifications, variations, and full and partial equivalents can be undertaken without departing from the invention as limited only by the spirit and scope of the appended claims.

What is desired to be secured by Letters Patent of the United States is as follows.

What is claimed is:

1. A FIFO memory system comprising:
a RAM memory;
a write pointer register for storing a minimum change coded address of the next data element to be written into said RAM memory;
a read pointer register for storing a minimum change coded address of the next data element to be read from said RAM memory;
an offset generator for comparing the contents of said registers, and generating at an output thereof an offset signal representing the amount of memory space occupied;

a programmable offset register for providing a programmed offset signal; and a comparator for comparing said offset signal and said programmed offset signal, and providing a ready signal when said offset signal is greater than or equal to said programmed offset signal.

2. The FIFO memory system of claim 1 wherein said write pointer register includes first means for incrementing said register in response to a write signal received thereby, and said read pointer register includes second means for incrementing said register in response to a read signal received thereby.

3. The FIFO memory system of claim 3 wherein said write signal has a leading and trailing edge and wherein said first means includes means responsive to said trailing edge.

4. The FIFO memory system of claim 3 wherein said RAM memory has means for writing data into said RAM memory in response to the reading edge of said write signal.

5. The FIFO memory system of 2 wherein said read signal has a leading and trailing edge and wherein said second means includes means responsive to said trailing edge.

6. The FIFO memory system of claim 5 wherein said RAM memory has means for reading data from said RAM memory in response to the loading edge of said read signal.

7. The FIFO memory system of claim 1 wherein said programmable offset register means for receiving a binary coded programmed offset signal, said system further comprising:

a binary to minimum change converter connecting said offset register to said comparator for providing said programmed offset signal to said comparator.

8. The FIFO memory system of claim 1 wherein said programmable offset register includes means for loading said register with said programmed offset signal.

9. The FIFO memory system of claim 8 wherein said RAM memory has an input data bus for writing data to said memory, and wherein said loading means includes a connection between said bus and said offset register.

10. The FIFO memory system of claim 9 wherein said loading means further includes a control line for enabling the loading of said programmable offset register.

11. The FIFO memory system of claim 10 wherein said programmable offset register includes a plurality of D type flip-flops, each flipflop having D and CK input ports and a Q output, wherein said D input ports are connected to respective lines in said input data bus, and said CK ports are connected to said control line.

12. The FIFO memory system of claim 1 wherein said RAM memory is a dual ported RAM having input and output data busses for writing data to and reading data from, respectively, said RAM memory.

13. The FIFO memory system of claim 1 wherein said offset generator includes means for performing in minimum change code an equivalent binary subtraction.

14. The FIFO memory system of claim 1 wherein said comparator includes:

a wrap around detector for receiving said offset signal, monitoring changes in said offset signal, determining if the RAM memory is full or empty when said offset is zero, and generating at an output thereof a wrap signal indicating full or empty;

a circuit for receiving said offset signal and programmed offset signal, determining when said offset signal is greater than or equal to said programmed offset signal, and generating at an output thereof a greater than or equal to signal; and a flag generator connected to the outputs of said wrap around detector, said circuit, and said offset generator for providing said ready signal.

15. The FIFO memory system of 14 wherein said flag generator includes mean for providing a full or empty signal indicating said RAM memory is full or empty, respectively.

16. The FIFO memory system of claim 14 wherein said wrap around detector includes a NAND gate and a D-type flip-flop having D and CK ports and a Q output port; wherein said D input port is connected to a single data bit line from the output of said offset generator, the inputs to said NAND gate are connected to a plurality of other data bit lines from the output of said offset generator, the output of said NAND gate is connected to said CK input port, and said Q output port provides said wrap signal.

17. The FIFO memory system of claim 14 wherein said flag generator includes an AND gate and a NOR gate, said AND gate receiving as inputs the inverse of said wrap and offset signals, said NOR gate receives as inputs the output of said AND gate and the inverse of said greater than or equal to signal.

18. A FIFO memory system comprising:

a RAM memory;

a write pointer register for storing a minimum change coded address of the next data element to be written into said RAM memory, said write pointer register including first means for incrementing said register in response to a write signal received thereby;

a read pointer register for storing a minimum change coded address of the next data element to be read from said RAM memory, said read pointer register including second means for incrementing said register in response to a read signal received thereby;

an offset generator for comparing the contents of said registers, and generating at an output thereof an offset signal representing the amount of memory space occupied;

a programmable offset register for providing a programmed offset signal, said register including means for loading said register with said programmed offset signal; and a comparator for comparing said offset signal and said programmed offset signal, and providing a ready signal when said offset signal is greater than or equal to said programmed offset signal; wherein said comparator includes:

a wrap around detector for receiving said offset signal, monitoring changes in said offset signal, determining if the RAM memory is full or empty when said offset is zero, and generating at an output thereof a wrap signal indicating full or empty;

a circuit for receiving said offset signal and programmed offset signal, determining when said offset signal is greater than or equal to said programmed offset signal, and generating at an output thereof a greater than or equal to signal; and a flag generator connected to the outputs of said wrap around detector, said circuit, and said offset generator for providing said ready signal.

19. The FIFO memory system of claim 18 wherein said programmable offset register includes means for receiving a binary coded programmed offset signal, said system further comprising:
a binary to minimum change code converter connecting said offset register to said comparator for providing said programmed offset signal to said comparator.

20. The FIFO memory system of claim 19 wherein:
said write and read signals each has a leading and trailing edge;
said first means includes means responsive to the trailing edge of said write signal;
said RAM memory has means for writing data into said RAM memory in response to the leading edge of said write signal;
said second means includes means responsive to the trailing edge of said read signal;
said RAM memory has means for reading data from said RAM memory in response to the leading edge of said read signal.

21. The FIFO memory system of claim 20 wherein said offset generator includes means for performing in minimum change code an equivalent binary subtraction.

22. A FIFO memory system comprising:
a RAM memory;
a write pointer register for storing the address of the next data element to be written into said RAM memory;
a read pointer register for storing the address of the next data element to be read from said RAM memory;
an offset generator for comparing the contents of said registers, and generation output thereof an offset signal representing the amount of memory space occupied;
a programmable offset register for providing a programmed offset signal; and
a comparator for comparing said offset signal and said programmed offset signal, and providing a ready signal when said offset signal is greater than or equal to said programmed offset signal.

23. The FIFO memory system of claim 22 wherein said comparator includes:
a wrap around detector for receiving said offset signal, monitoring changes in said offset signal, determining if the RAM memory is full or empty when said offset is zero, and generating at an output thereof a wrap signal indicating full or empty;
a circuit for receiving said offset signal and programmed offset signal, determining when said offset signal is greater than or equal to said programmed offset signal, and generating at an output thereof a greater than or equal to signal; and
a flag generator connected to the outputs of said wrap around detector, said circuit, and said offset generator for providing said ready signal.

24. A method for buffering data between two data busses comprising:
loading a programmable offset register with a programmed offset value;
writing a data element into a RAM memory;
incrementing a write pointer in a minimum change code to identify the address of the next data element to be written into said RAM memory;
providing a read pointer for identifying in a minimum change code the address of the next data element to be read from said RAM memory;
comparing the contents of said write and read pointers and generating an offset value therefrom;
comparing said offset value with said programmed offset value; and
generating a ready signal indicating said RAM memory is ready to be read when said offset value is greater than or equal to said programmed offset value.

25. The method of claim 24 further comprising:
reading the contents of said RAM memory; and
incrementing said read pointer in response to the reading of said RAM memory.

26. The method of claim 24 wherein said step of comparing the contents of said write and read pointers comprises:
performing in minimum change code an equivalent binary subtraction of the contents of said pointers thereby generating a minimum change coded offset value.

27. The method of claim 24 wherein said step of comparing said offset value with said programmed offset value comprises:
monitoring changes in said offset value;
determining if the RAM memory is full or empty when the offset value is zero; and
generating a full or empty signal indicating the RAM memory is full or empty, respectively, when the offset value is zero.

28. The method of claim 24 wherein said step of comparing said offset value with said programmed offset value comprises:
determining when said offset value is greater than or equal to said programmed offset value;
generating a signal indicating when said offset value is greater than or equal to said programmed offset value.

29. A method for buffering data between two data busses comprising:
loading a programmable offset register with a programmed offset value;
writing a data element into a RAM memory;
incrementing a write pointer in a minimum change code to identify the address of the next data element to be written into said RAM memory;
providing a read pointer for identifying in a minimum change code the address of the next data element to be read from said RAM memory;
comparing the contents of said write and read pointers by performing in minimum change code an equivalent binary subtraction of the contents of said pointers thereby generating a minimum change coded offset value therefrom;
comparing said offset value with said programmed offset value by:
monitoring changes in said offset value;
determining if the RAM memory is full or empty when the offset value is zero;
generating a full or empty signal indicating the RAM memory is full or empty, respectively, when the offset value is zero;
determining when said offset value is greater than or equal to said programmed offset value; and
generating a signal indicating when said offset value is greater than or equal to said programmed offset value;
generating a ready signal indicating said RAM memory is ready to be read when said offset value is greater than or equal to said programmed offset value;

reading the contents of said RAM memory;

incrementing said read pointer in response to the reading of said RAM memory.

30. A method for buffering data between two data busses comprising:

loading a programmable offset register with a programmed offset value;

writing a data element into a RAM incrementing a write pointer to identify the address of the next data element to be written into said RAM memory;

providing a read pointer for identifying the address of the next data element to be read from said RAM memory;

comparing the contents of said write and read pointers and generating an offset value therefrom;

comparing said offset value with said programmed offset value; and generating a ready signal indicating said RAM memory is ready to be read when said offset value is greater than or equal to said programmed offset value.

31. The method of claim 30 further comprising:

reading the contents of said RAM memory; and incrementing said read pointer in response to the reading of said RAM memory.

32. The method of claim 30 wherein said step of comparing the contents of said write and read pointers comprises:

subtracting the contents of said pointers thereby generating an offset value.

33. The method of claim 30 wherein said step of comparing said offset value with said programmed offset value comprises:

monitoring changes in said offset value;

determining if the RAM memory is full or empty when the offset value is zero; and generating a full or empty signal indicating the RAM memory is full or empty, respectively, when the offset value is zero.

34. The method of claim 30 wherein said step of comparing said offset value with said programmed offset value comprises:

determining when said offset value is greater than or equal to said programmed offset value;

generating a signal indicating when said offset value is greater than or equal to said programmed offset value.

* * * * *

UNITED STATES PATENT AND TRADEMARK OFFICE
CERTIFICATE OF CORRECTION

PATENT NO. : 5,267,191

DATED : November 30, 1993

INVENTOR(S) : David L. Simpson

It is certified that error appears in the above-indentified patent and that said Letters Patent is hereby corrected as shown below:

Column 11, Line 13, "claim 3", should be --claim 2--.

Column 11, Line 19, "reading" should be --leading--.

Column 11, Line 27, "loading" should be --leading--.

Column 11, Line 30, after "register", insert --includes--.

Column 11, Line 33, after "change", insert --code--.

Column 12, Line 9, after "of", insert --claim--.

Column 12, Line 11, "mean" should be --means--.

Column 12, Line 15, after "CK", insert --input--.

Column 13, Line 34, delete "generation" and insert --generating at an--.

Column 15, Line 10, after "RAM", insert --memory--.

UNITED STATES PATENT AND TRADEMARK OFFICE
CERTIFICATE OF CORRECTION

PATENT NO. : 5,267,191

DATED : November 30, 1993

INVENTOR(S) : David L. Simpson

It is certified that error appears in the above-indentified patent and that said Letters Patent is hereby corrected as shown below:

Column 16, line 22, after ";" insert —and—.

Signed and Sealed this

Twenty-third Day of August, 1994

Attest:

BRUCE LEHMAN

Attesting Officer

Commissioner of Patents and Trademarks